United States Patent
Leshem et al.

(10) Patent No.: US 12,067,701 B2
(45) Date of Patent: Aug. 20, 2024

(54) MANAGEMENT AND CONTROL SYSTEM FOR AN INSPECTION APPARATUS

(71) Applicant: INSPECT TECHNOLOGIES LTD, Karmiel (IL)

(72) Inventors: Nadav Leshem, Lavon (IL); Edo Reshef, Hod Hasharon (IL)

(73) Assignee: INSPECT TECHNOLOGIES LTD, Karmiel (IL)

( * ) Notice: Subject to any disclaimer, the term of this patent is extended or adjusted under 35 U.S.C. 154(b) by 618 days.

(21) Appl. No.: 17/157,199

(22) Filed: Jan. 25, 2021

(65) Prior Publication Data

US 2021/0192715 A1   Jun. 24, 2021

Related U.S. Application Data

(63) Continuation-in-part of application No. 16/400,614, filed on May 1, 2019, now Pat. No. 10,902,575.

(51) Int. Cl.
*G06V 10/00* (2022.01)
*B07C 5/342* (2006.01)
(Continued)

(52) U.S. Cl.
CPC .......... *G06T 7/0004* (2013.01); *B07C 5/3425* (2013.01); *G06F 3/147* (2013.01);
(Continued)

(58) Field of Classification Search
CPC ..... G06T 7/0002; G06T 7/0004; G06T 7/408; G06T 7/001; G06T 5/40;
(Continued)

(56) References Cited

U.S. PATENT DOCUMENTS

| | | | | |
|---|---|---|---|---|
| 4,015,366 A | * | 4/1977 | Hall, III | A01G 3/04 193/25 E |
| 5,488,479 A | * | 1/1996 | Williams | B07C 5/3425 356/402 |
| 5,526,119 A | * | 6/1996 | Blit | B07C 5/3422 356/402 |
| 5,917,927 A | * | 6/1999 | Satake | G01N 21/85 382/110 |

(Continued)

FOREIGN PATENT DOCUMENTS

| | | |
|---|---|---|
| CN | 2740303 Y | 11/2005 |
| JP | S5924180 U | 2/1984 |

(Continued)

OTHER PUBLICATIONS

JP2007047985 A Published applicationFeb. 22, 2007, "Image-displaying program and image-displaying device".*

*Primary Examiner* — Amir Alavi
(74) *Attorney, Agent, or Firm* — William H. Dippert; Laurence A. Greenberg; Werner H. Stemer

(57) ABSTRACT

A management and control system is provided for a user to interface with an inspecting apparatus having at least one digital optical instrument. The management and control system comprises a processor configured to receive images from the at least one digital optical instrument, analyze the images, and transmit instructions to the inspecting apparatus, and a display configured to display analysis of the images wherein the user is capable of interfacing and providing instructions to the inspecting apparatus based on the analysis of the images, wherein the display simultaneously displays histograms and thumbnail-image generated in the processor based on the images. A method for controlling and managing the inspecting apparatus for items as well as an UI are disclosed.

14 Claims, 20 Drawing Sheets

(51) Int. Cl.
*G06F 3/147* (2006.01)
*G06T 7/00* (2017.01)

(52) U.S. Cl.
CPC ............... *B07C 2501/0036* (2013.01); *B07C 2501/0072* (2013.01); *B07C 2501/0081* (2013.01); *B07C 2501/009* (2013.01); *G06T 2207/10081* (2013.01); *G06T 2207/10088* (2013.01); *G06T 2207/10116* (2013.01); *G06T 2207/30128* (2013.01); *G06T 2207/30136* (2013.01)

(58) Field of Classification Search
CPC . G06T 2207/10016; G06T 2207/10024; G06T 2207/10081; G06T 2207/10088; G06T 2207/10116; G06T 2207/30136; G06T 2207/30148; G06T 2207/30164; A01D 41/127; A01D 41/1208; A01D 41/1277; H04N 5/2256; H04N 23/57; B07C 2501/0036; B07C 2501/0072; B07C 2501/0081; B07C 2501/009; B07C 5/3422; B07C 5/342; B07C 5/3425; G06F 3/147

See application file for complete search history.

(56) References Cited

U.S. PATENT DOCUMENTS

| | | | |
|---|---|---|---|
| 7,280,198 B2 | 10/2007 | Blanc | |
| 7,340,084 B2 | 3/2008 | Hamid | |
| 8,026,956 B2 * | 9/2011 | Kurane | H04N 23/60 348/222.1 |
| 9,177,677 B2 * | 11/2015 | Kurosawa | G01N 1/32 |
| 9,676,005 B2 | 6/2017 | Ishizu et al. | |
| 10,902,575 B2 * | 1/2021 | Leshem | A01D 41/1208 |
| 10,918,016 B2 * | 2/2021 | Mishra | B07B 13/065 |
| 10,959,383 B2 * | 3/2021 | Lys | F21V 23/06 |
| 2006/0016735 A1 | 1/2006 | Ito | |
| 2019/0073759 A1 * | 3/2019 | Hadar | G06T 7/90 |
| 2021/0090184 A1 * | 3/2021 | Weiss | G06T 11/00 |
| 2021/0173119 A1 * | 6/2021 | Singh | A01B 79/005 |

FOREIGN PATENT DOCUMENTS

| | | |
|---|---|---|
| JP | 2006026469 A | 2/2006 |
| JP | 2006055846 A | 3/2006 |
| JP | 2009095758 A | 5/2009 |
| JP | 2010197239 A | 9/2010 |
| JP | 2014157119 A | 8/2014 |
| JP | 2017080661 A | 5/2017 |

* cited by examiner

MANAGEMENT AND CONTROL SYSTEM FOR AN INSPECTION APPARATUS

CROSS-REFERENCE TO RELATED APPLICATION

This application is a continuation-in-part of co-pending U.S. patent application Ser. No. 16/400,614, filed May 1, 2019, incorporated herein by reference in its entirety.

TECHNICAL FIELD

The present disclosed subject matter relates to automated inspection apparatus. More particularly, the present disclosed subject matter relates to managing and controlling system for a user to interface with inspecting apparatus.

BACKGROUND

Automated inspection is a process of inspecting small solid materials, typically hard, as a part of controlling the quality of the particles in a production line. Optionally, the inspecting process can have a sorting process of the materials. Commercially available inspecting machines use optical sensors and image processing for determining impurities, change in geometry, and color. Typically, the inspecting machines compare the solid particles objects to user-defined baseline thresholds for qualifying the material into production/shipment or failing it.

Old fashion manual inspecting and/or sorting is subjective, unreliable and inconsistent, whereas optical sorting improves the overall product quality, maximize throughput, increase yields and reduces manual labor costs.

Inspecting machines can be used for products such as plastic grains, metal, or glass grains, or the like as well as food material such as beans, spices, nuts, grains, rice, vegetables and fruits.

BRIEF SUMMARY

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

It is therefore provided in accordance with the present subject matter, a management and control system for a user to interface with an inspecting apparatus having at least one digital optical instrument, the management and control system comprising:
 a processor configured to receive images from the at least one digital optical instrument, analyze the images, and transmit instructions to the inspecting apparatus;
 a display configured to display analysis of the images wherein the user is capable of interfacing and providing instructions to the inspecting apparatus based on the analysis of the images, wherein the display simultaneously displays histograms and thumbnail-image generated in the processor based on the images.

In accordance with another preferred embodiment, the inspecting and sorting apparatus is configured to inspect items selected from a group of items consisting of beans, spices, nuts, grains, rice, vegetables, fruits, plastic grains, metal grains, glass grains, pharmaceutical pills.

In accordance with another preferred embodiment, the at least one digital optical instrument is selected from a group of optical instruments consisting of X-ray detector, magnetic resonance imaging (MRI) device, computed tomography (CT) scanner, 3D data scanner, camera, optical sensor.

In accordance with another preferred embodiment, the display is selected from a group of displays consisting of monitor, screen, electroluminescent (ELD) display device, liquid crystal display (LCD) device, light-emitting diode (LED) device, plasma (PDP) display, electronic hand-held device such as a tablet, a smartphone device.

In accordance with another preferred embodiment, the instructions are selected from a group of instructions consisting of sorting the items, enable ejection of items, disable ejection of items, generate report, setting discrimination level, diverting the items, setting thresholds to generate alarms, defining data set for automatic prediction and alarming, defining setpoint for production line control.

In accordance with another preferred embodiment, the management system further comprises a memory unit communicating with said processor wherein the memory unit is configured to retain information selected from a group of information consisting of the images, reference images, a plurality of profiles of the items, system settings, system reports, image analysis, reference profiles comprising thresholds for different types of items, statistical analysis associated with reference profiles.

In accordance with another preferred embodiment, the display graphically displays graphs generated in the processor based on the images.

In accordance with another preferred embodiment, the inspecting apparatus is incorporated within a production line.

It is also provided in accordance with another preferred embodiment, a method of managing and controlling an inspecting apparatus of items, the method comprising:
 capturing images of the items inspected by at least one digital optical instrument of the inspecting apparatus;
 receiving by a processor the images from the at least one digital optical instrument;
 analyzing the images by the processor so as to have an analysis of the items;
 displaying the analysis on a display wherein while simultaneously displaying histogram representations and thumbnail images; and
 receiving by the inspecting apparatus instructions interfaced by a user.

In accordance with another preferred embodiment, the analyzing the images comprises determining criteria of each item in the image, wherein the criteria are selected from the group consisting of impurities, change in geometry, color of the items, dark specks, dark gels, dark and bright contaminations, foreign material, discoloration, cross-contamination, color measurement and color shift, size deviation, shape irregularities, agglomeration, transparency, gloss of the items.

In accordance with another preferred embodiment, the method further comprising generating histogram representations of dimensions and criteria of the items.

In accordance with another preferred embodiment, the method further comprising setting thresholds based on the histogram representations, thumbnail images, and graphs.

In accordance with another preferred embodiment, the instructions interfaced by a user comprises instructions selected from a group of instructions consisting of sorting the items, enable ejection of items, disable ejection of items, generate report, setting discrimination level, diverting the items, setting thresholds to generate alarms, defining data set for automatic prediction and alarming, defining setpoint for production line control.

In accordance with another preferred embodiment, an interface interfacing is provided between a user and an inspecting apparatus so as to allow the user to simultaneously receive visual and statistical information from the inspecting apparatus and provide instructions to the inspecting apparatus, the interface comprising:

- a processor configured to receive images from the inspecting apparatus, display at least a portion of the images, perform statistical analysis based on the images and form distribution histograms;
- a display configured to simultaneously display at least the portion of the images and the distribution histograms; and
- input device for the user to provide instructions to the processor and interface with the inspecting and sorting apparatus.

In accordance with another preferred embodiment, the at least portion of the images and the distribution histograms correspond to one another.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Figure 1:
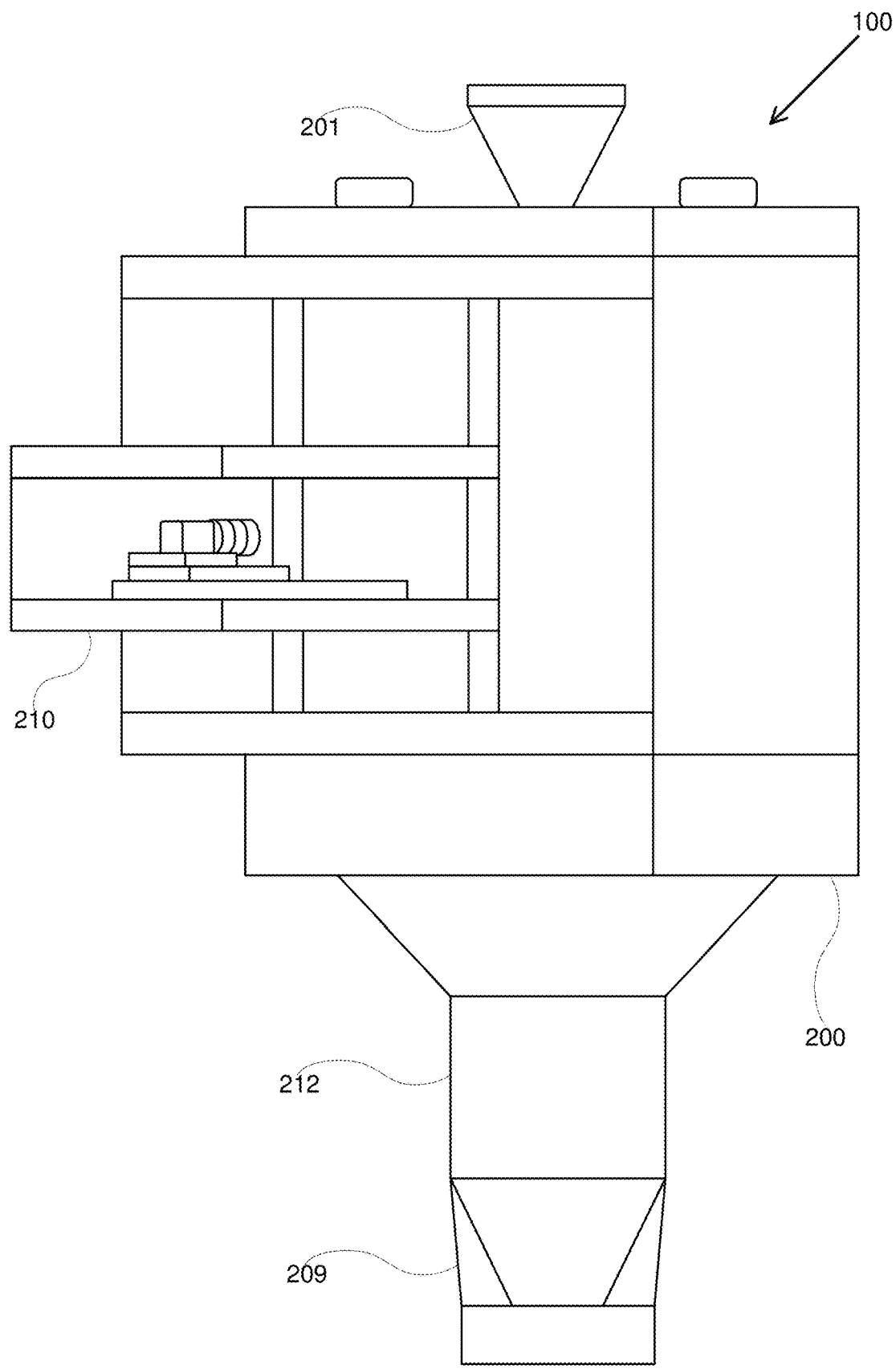
FIG. 1 illustrates an automated grains inspection apparatus (AIA), in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps, and/or parts, but only if the additional ingredients, steps and/or parts do not materially alter the basic and novel characteristics of the claimed composition, method or structure.

As used herein, the singular form "a", "an", and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1 showing an automated grains inspection apparatus (AIA), in accordance with some exemplary embodiments of the disclosed subject matter. The AIA 100 is an apparatus configure to run a quality control process of inspecting solid material in a production line. In some exemplary embodiments, AIA 100 can be adapted to inspect and sort the material according to criteria, such as color, size, shape, structural properties and any combination thereof, or the like. The material sorted by AIA 100 is a plurality of discrete items, such as for example beans, spices, nuts, grains, rice, vegetables, fruits, plastic grains, metal grains, glass grains, pharmaceutical pills, and any combination thereof, or the like.

For the sake of simplicity, the present disclosure shall refer hereinafter to the material that is sorted by the AIA 100 as "grains" or "items".

In some exemplary embodiments, the AIA 100 can be used in-line a production-line; off-line the production-line; in-parallel to the production-line; and any combination thereof. In the in-line exemplary embodiment, all the grains to be consumed in production first enters the AIA 100, for inspecting, through an inlet, and preferably an inlet funnel 201 and proceed to the production-line from outlet 209, where the grains are discharged. In the off-line exemplary embodiment, all or portion of the grains may be tested after being introduced to the production line. In the in-parallel exemplary embodiment, a portion of the material to be consumed in production enters the AIA 100, for inspecting or sorting, through inlet funnel 201 and proceed to the production-line from outlet 209.

Figure 2A:
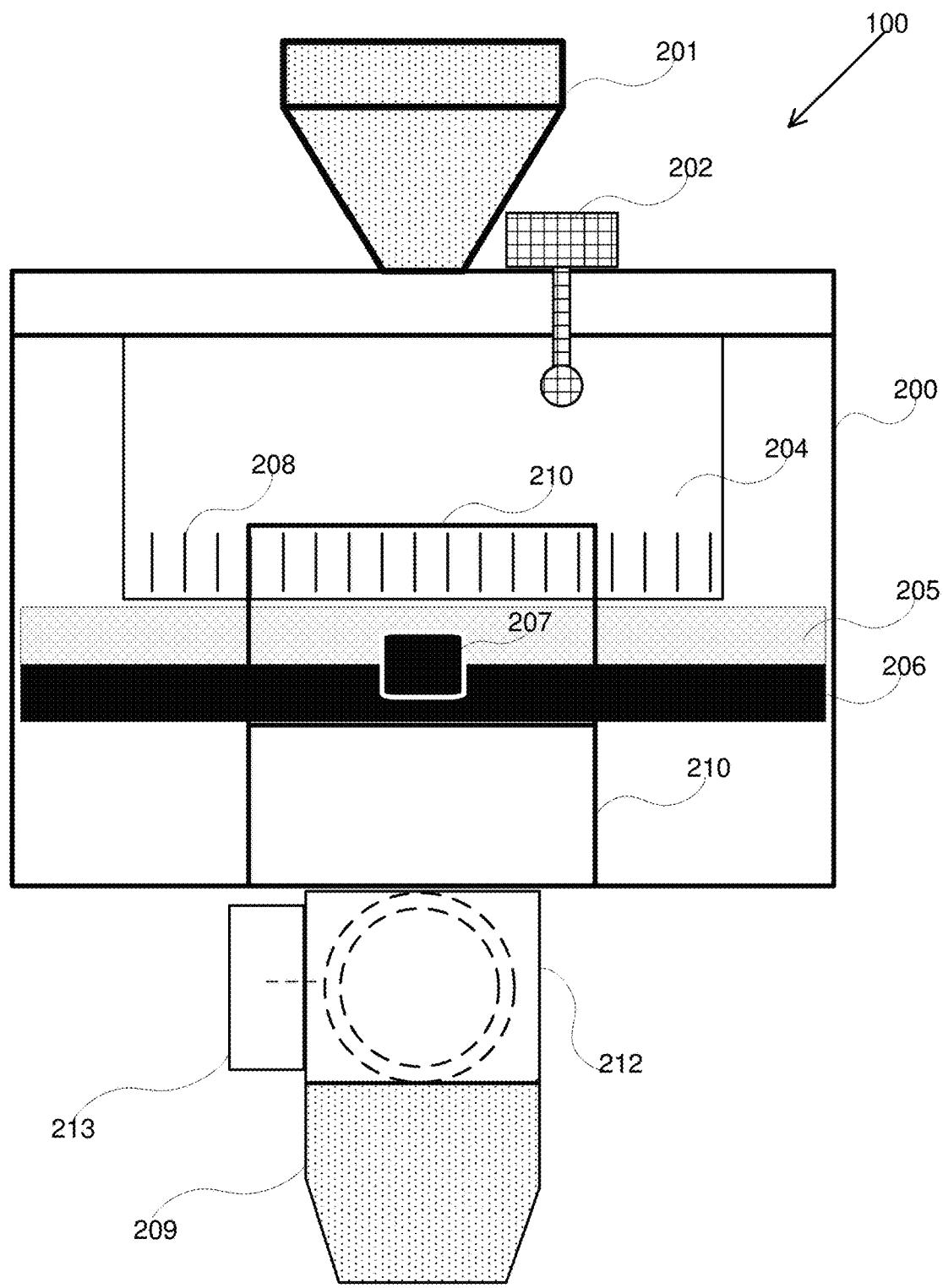
FIG. 2A illustrates a front view of the automated grains inspection apparatus, in accordance with some exemplary embodiments of the disclosed subject matter.

Referring now to FIG. 2A showing a front view of the automated grains inspection apparatus, in accordance with some exemplary embodiments of the disclosed subject matter. AIA 100 comprises a housing 200 having an inspection zone, inlet funnel 201, outlet 209, second outlet 212 and sorting mechanism 213. In some exemplary embodiments, inlet funnel 201 is interfacing between housing 200 and feeding tube or a hopper (not shown), which enables pouring grains into the AIA 100. Housing 200 also incorporates feeder mechanism 202, slot feeder 204, background surface and preferably a first background surface 205, a second background surface 206, and a camera 207.

In some exemplary embodiments, slot feeder 204 is adapted to receive grains from inlet funnel 201 and release them in line formation into the inspection zone of the housing, where the line thickness is substantially and preferably, but not necessarily equivalent to a thickness of a single grain. In that way, the slot feeder 204 acts as a buffer that collects grains and align them in a single line formation, across the housing 200, so that they fall as curtainlike through the housing and through an inspection zone in which the grains are being imaged. In some exemplary embodiments, the feeder mechanism 202 can be used for adjusting the line thickness of an outlet (not shown) of the slot feeder 204 to a thickness of a single grain, or any other suitable thickness. In some exemplary embodiments, the first background surface 205 and the second background surface 206 may each constitutes a different background for images taken by camera 207. It should be noted that camera 207, situated on camera compartment 210, faces (looking at) the curtainlike released grains and backgrounds 205 and 206 that are situated behind the curtainlike falling grains.

It should be also noted that a plurality of cameras can be used. One or more of the plurality of cameras can be positioned opposite the camera depicted in FIG. 2A. In this way, the oppositely positioned camera captures images from the other side of the grains. The oppositely positioned camera can be provided with an independent illumination system and set of backgrounds. This double functioning apparatus enables capturing images for full inspection of the grains.

In some other exemplary embodiments, the grains can slide in a curtainlike structure on a surface that is inclined beneath the slot feeder, wherein the surface can be the background surface as an example. This optional structure can decrease the velocity of the grains when they pass through the inspection zone so as to enhance the quality of the image that will be captured by the camera. Generally, and in this case particularly, the slot in the slot feeder can be wider or a feeder can be used that has no slot and the grains pass through a feeder having another opening profile.

In some exemplary embodiments, upon detecting grains that fails (unqualified) quality control inspection, the sorting mechanism 213 can be configured to deflect unqualified grains from outlet 209 to second outlet 212. It is provided in accordance with one aspect of the present subject matter a control system for a user to interface with an inspecting apparatus having at least one digital optical instrument, the control system comprising:

a processor configured to receive images from the at least one digital optical instrument, analyze the images, and transmit instructions to the inspecting apparatus; and a display configured to display analysis of the images wherein the user is capable of interfacing and providing instructions to the inspecting apparatus based on the analysis of the images.

It is also provided in accordance with yet another aspect of the present subject matter, an interface interfacing between a user and an inspecting apparatus so as to allow the user to simultaneously receive visual and statistical information from the inspecting apparatus and provide instructions to the inspecting apparatus, the interface comprising:

a processor configured to receive images from the inspecting apparatus, display at least a portion of the images, perform statistical analysis based on the images and form distribution histograms;

a display configured to simultaneously display the at least a portion of the images and the distribution histograms; and input device for the user to provide instructions to the processor and interface with the inspecting apparatus.

Figure 2B:
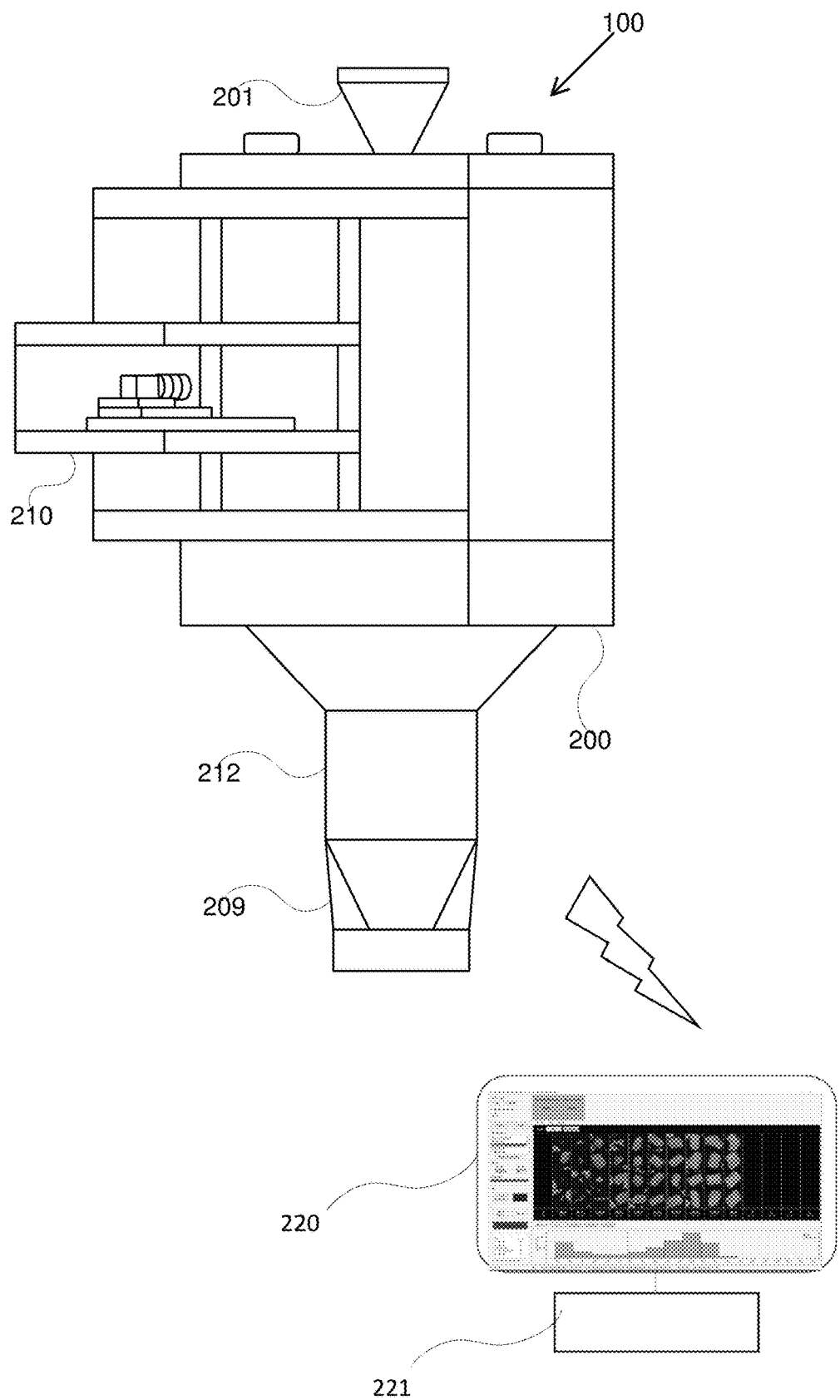
FIG. 2B illustrates a front view of the automated grains inspection apparatus of FIG. 1 comprising a display device, in accordance with some exemplary embodiments of the disclosed subject matter.

Referring now to FIG. 2B illustrating a front view of the automated grains inspection apparatus of FIG. 2 comprising a display device, in accordance with some exemplary embodiments of the disclosed subject matter. In this embodiment, the AIA 100 further comprises a display device 220 such as a screen capable of displaying information. Display device 220 can be, for example, Electroluminescent (ELD) display device, Liquid crystal display (LCD) device, Light-emitting diode (LED) device, Plasma (PDP) display, a combination thereof or the like. The terms "display device" and "screen" are used for substantially the same feature and therefore, the terms can be interchanged. Screen 220 can be either connected to AIA 100 by wires or wirelessly. In some embodiments, screen 220 can be a computer monitor. In another embodiment, screen 220 can be on a remote device, such as an electronic hand-held device, for example a tablet. In yet another embodiment, screen 220 can be a smartphone device.

The information displayed on screen 220 can be either visual or tactile. Preferably, the information will be presented using graphical user interface (GUI). GUI is a form of user interface that allows users to interact with electronic devices through graphical icons and audio indicator such as primary notation, instead of text-based user interfaces, typed command labels or text navigation. The information is received from camera 207, or from any other digital optical instrument such as X-ray detector, magnetic resonance imaging (MRI) device, computed tomography (CT) scanner, 3D data scanner and the like. Optionally, information can be retrieved from more than one digital optical instrument. The screen 220 displays histograms as will be elaborated hereinafter. The user interfaces with the AIA through an input device 221. The input device can be from a group of devices such as keyboard, mouse, video, touch screen, etc.

Figure 2C:
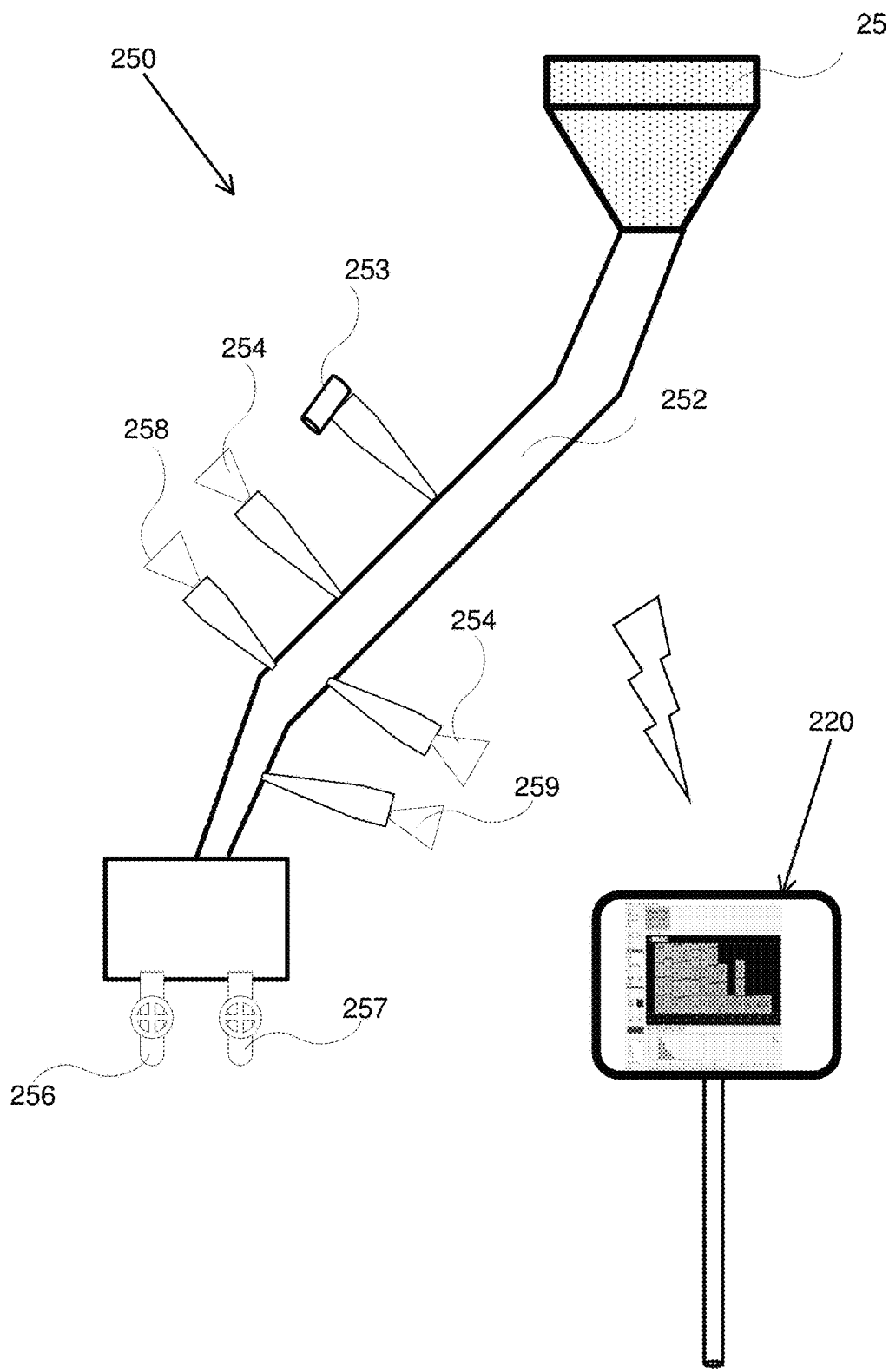
FIG. 2C illustrates a front view of another sorting system comprising a display device, in accordance with some exemplary embodiments of the disclosed subject matter.

Referring now to FIG. 2C illustrating a front view of another sorting system comprising a display device, in accordance with some exemplary embodiments of the disclosed subject matter. Sorting system 250 is operated to perform a quality control process of inspecting solid material in a production line. Sorting system 250 comprises material feed 251 connected to transport system 252. Transport system 252 is attached to X-ray inspection component 253 that is followed by at least one optical inspection component 254. Additional optical inspection component 258 and color camera 259 can be used to inspect the items. Sorting unit 255 sorts the inspected items, and separates them into rejected materials reservoir 256 and clean materials reservoir 257. Screen 220 is attached to sorting unit 250, displaying visual information related to inspection of items as will be discussed hereinafter.

Figure 2D:
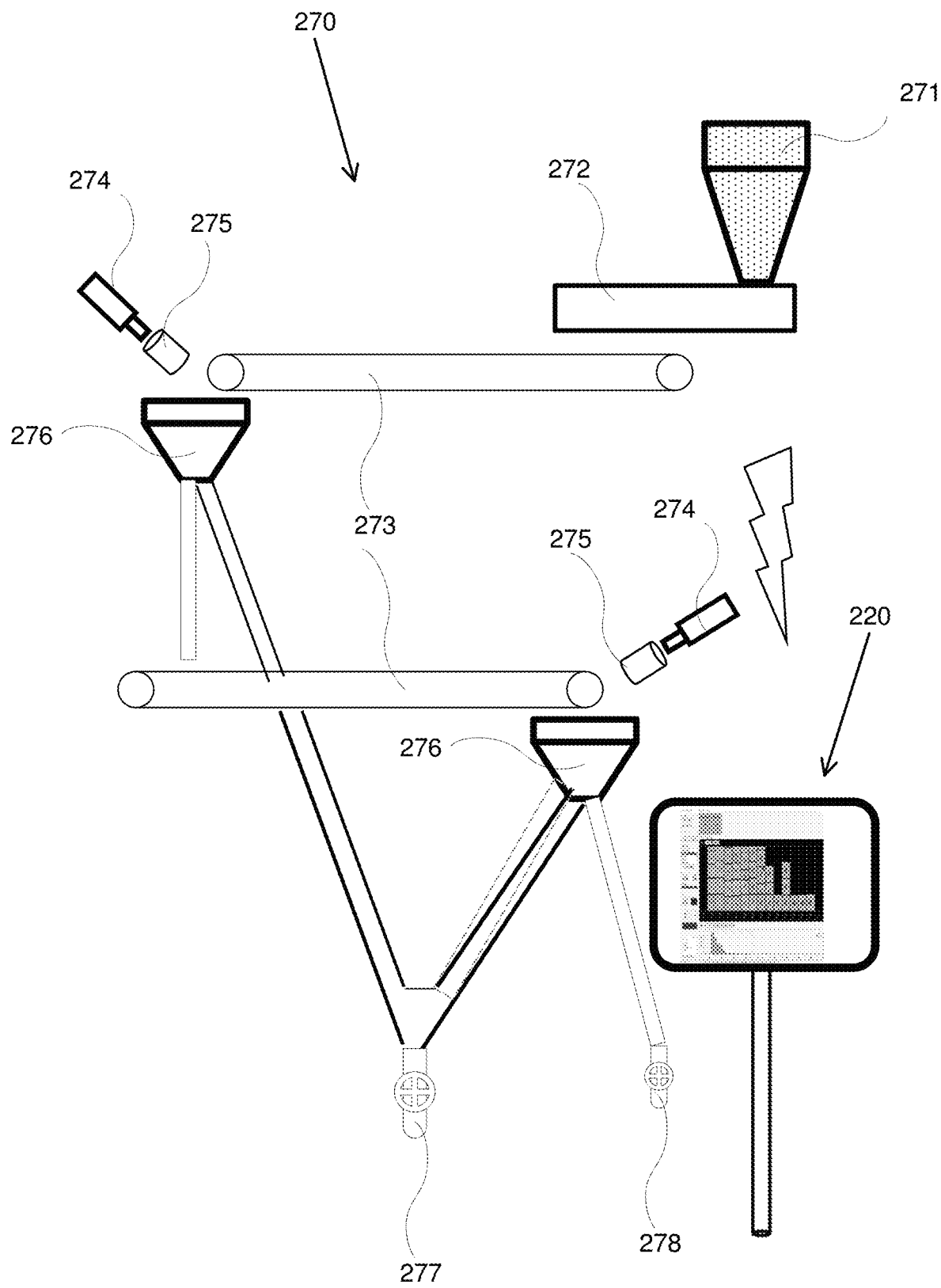
FIG. 2D illustrates a front view of yet another sorting system comprising a display device, in accordance with some exemplary embodiments of the disclosed subject matter.

Referring now to FIG. 2D illustrating a front view of a yet another sorting system comprising a display device, in accordance with some exemplary embodiments of the disclosed subject matter. Sorting system 270 is operated to perform a quality control process of inspecting and sorting solid material in a production line. Sorting system 270 comprises pre-hopper 271 connected to product feed 272. Product feed 272 is attached to transport system 273 that moves the items into the inspection area. Inspection area comprises a charge-coupled device (CCD) 274 and fluorescent lamps 275. Ejection nuzzle 276 ejects the inspected items that are rejected into reservoir 278. Items that were not rejected are moved by transform system 273 to second inspection area. Second inspection area comprises a charge-coupled device (CCD) 274 and fluorescent lamps 275. Ejection nuzzle 276 ejects the inspected items that are rejected into reservoir 278. Items that were not rejected are ejected into reservoir 278. Screen 220 is attached to sorting unit 270, displaying visual information of histograms bearing visual information and statistical information related to inspection of items such as distribution of the items of specific type or size, as will be discussed hereinafter.

Figure 3:
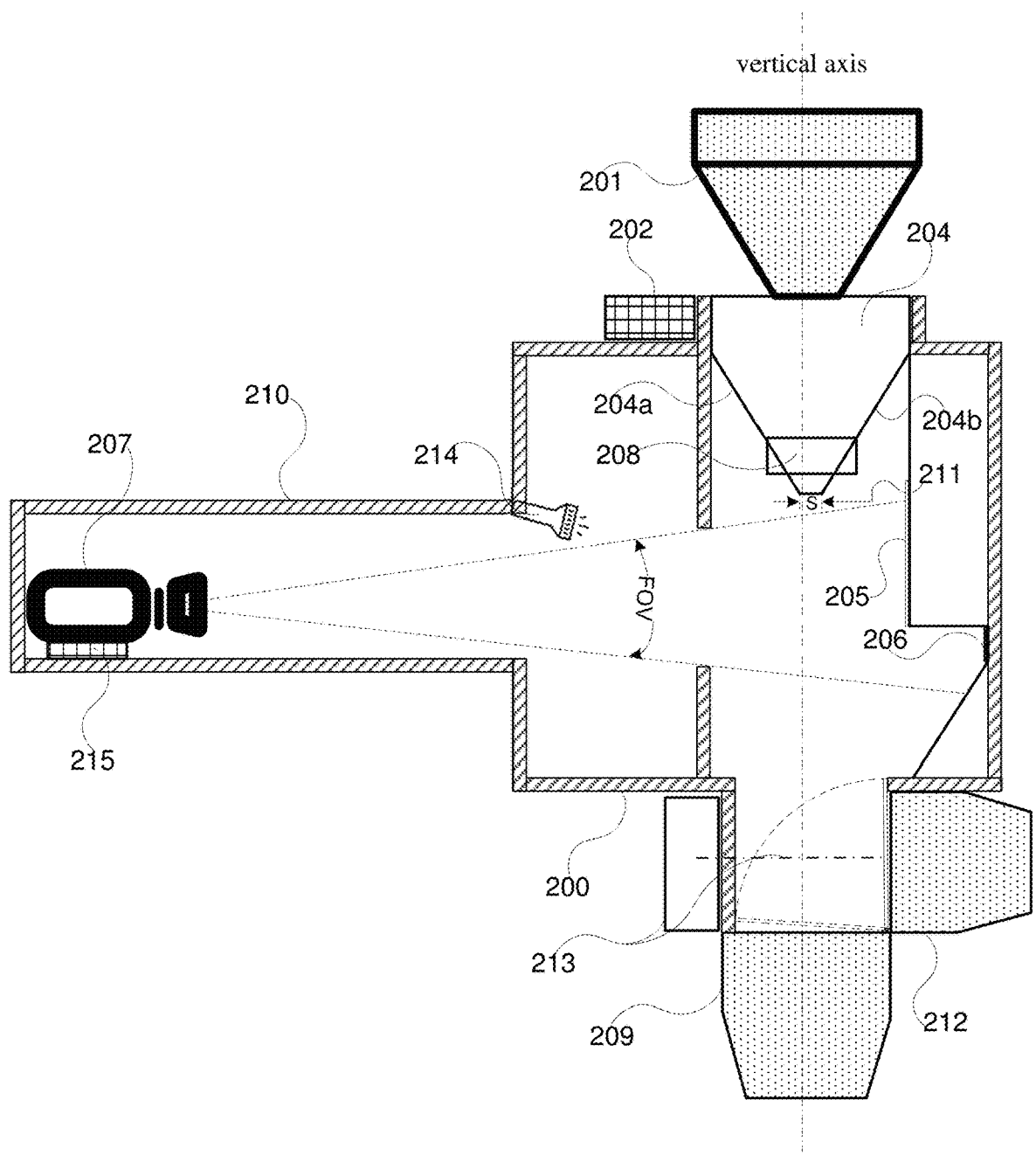
FIG. 3 shows a cross-sectional side view of the automated grains inspection apparatus, in accordance with some exemplary embodiments of the disclosed subject matter.

Referring now to FIG. 3 illustrating a cross-sectional side view of the automated grains inspection apparatus (AIA), in accordance with some exemplary embodiments of the disclosed subject matter. Slot feeder 204 comprises mainly of two panels (204a and 204b) facing each other, however each of which is tilted away from the vertical axis of the AIA 100. It can be appreciated from cross-sectional side view that slot feeder 204 has a trapezoid shape, in which the top base of the trapezoid is wide open as opposed to the narrow base (labeled "S" for slot), which can be adjusted by feeder mechanism 202. In some exemplary embodiments, the feeder mechanism 202 can adjust slot 211 of slot feeder 204 to a span that correspond to typical thickness of a type of grain under inspection.

It will be noted that grains poured to inlet funnel 201 ingress slot feeder 204, via the so called "top base of the trapezoid" and egress the slot feeder, in curtainlike formation, into outlet 209 while crossing the field of view (FOV) of camera 207. In some exemplary embodiments, the span of slot 211 can be manually adjusted by means of feeder mechanism 202. For example, handle, lever, screw bolt, and any combination thereof, or any commercially available mechanical means. Additionally, or alternatively, feeder mechanism 202 can be configured to be automatically adjusting the span of slot 211, by means of: electrical/pneumatic motor, actuators, and any combination thereof, or the like. In some exemplary embodiments, the automatic adjustment of the feeder mechanism 202 can be controlled by a controller of the present disclosure (to be described in detail further below).

In some exemplary embodiments, sorting mechanism 213 can be comprised of mechanism types, such as deflection; flap removal; pressurized-air removal, diverter valve, and any combination thereof, or the like.

Both flap and pressurized-air removal can be utilized for rejecting a relatively small number of grains that fail the quality control. In some exemplary embodiments, upon detection of unqualified grain (to be described in detail further below) a small number of grains are removed from the production line by either a flap type or pressurized-air. It should be noted that, this removal either by the flap or by pressurized-air may be primarily, however not necessarily, used in an in-line and in-parallel production-line configurations. It should also be noted that, this discarding (removing) process may be repetitive as long as unqualified grains are detected.

In some exemplary embodiments, the flap removal type may be based, for example, a piece of a flat shelf hinged on one side, that covers an opening. Upon activation, the flap opens to enable a predetermine number of grains to be discarded.

In some exemplary embodiments, the pressurized-air removal type can be based on a commercially available air nozzle that blasts away, upon activation, a number of grains.

The approximate amount/number of grains to be discarded can be controlled by adjusting the blast duration and diameter of the air jet.

In some exemplary embodiments, a deflection sorting mechanism may be primarily, however not necessarily, utilized in an off-line the production-line configuration. The deflection mechanism type may be based on a hinged door that operates as a selector allowing grains to outlet 209, i.e., to production line, or deflect the grains to second outlet 212. Typically, activation deflection allows relatively large amount of grains to be discarded, i.e., second outlet 212, opens to enable a predetermine number of grains to be discarded.

In some exemplary embodiments of the disclosed subject matter, the sorting mechanism 213, such as the types listed above may utilize solenoids, motors, actuators pneumatic components, and any combination thereof, or the like for implementing any or all the sorting mechanism types.

Among other components, FIG. 3 depicts the side view of camera 207, the first background surface 205, the second background surface 206 and at least one background illumination 214. In some exemplary embodiments, camera 207 may be situated in camera assembly 210 that enables sliding the camera forward and backward, i.e., toward and away from background surfaces 205 and 206, so that the camera's FOV shall cover an area containing both backgrounds. The sliding of camera 207 may be done by means of sliding mechanism 215 in order to adjust the distance between a focal point of the camera and the area covering the background, hereinafter region of interest (ROI). In some exemplary embodiments, sliding mechanism 215 may be controlled either manually and or automatically by means of motion control unit (MCU) 604 (to be described in detail further below).

Camera 207 of the present disclosure is configured to obtain an image of grains falling from the slot feeder 204, in curtainlike formation, in front of the first and second background surfaces 205 and 206. In some exemplary embodiments, camera 207 can be a video camera, a line scan camera, a stills camera, a monochromatic camera, a color camera, an area camera, and any combination thereof, or the like. An area camera is beneficial to be used in the current apparatus since it can capture a significant number of grains on more than one background. The sensor used in the area camera has a large matrix of image pixels so that a usual two-dimensional image can be generated in one exposure cycle, and therefore, its efficiency is enhanced relative to the other options. At least one of the plurality of cameras should be an area camera. Additionally, or alternatively, camera 207 can comprise different wavelengths optical filters (not shown) that may be configured as lowpass, high-pass, band-pass, and any combination thereof, or the like. The filters may be used for color correction; color conversion; color subtraction; contrast enhancement; polarizing; neutral density; cross screen; diffusion and contrast reduction, and any combination thereof, or the like. It should be noted that, the optical filters may be utilized for enhancing spatial, contrast and color resolution of grains (shall be described in detail further below). In some exemplary embodiments, camera 207 can be comprised of a plurality of cameras, wherein each camera of the plurality of cameras can be configured for acquiring different image properties. It should be noted that, the image may be video, at least one still photo, and a combination thereof and wherein the image may be retained in a digital representation.

In some exemplary embodiments, the at least one background illumination 214 can be situated in front of the backgrounds, behind the backgrounds, or both, i.e., in front and behind the backgrounds. Additionally, or alternatively, at least one of the background illuminations 214 may have different wave length or can use subtraction filters, intended for color separation. Additionally, or alternatively, one of the surfaces is can act also as an illuminator.

In some exemplary embodiments, first background surface 205 can be (however not limited to) white, and second background surface 206 can be (however not limited to) black. It should be noted that, that ROI acquired by camera 207 is configured to capture grains falling in front of the white and black background, i.e. first and second background surfaces 205 and 206, respectively. In some exemplary embodiments, the first and second background surfaces 205 and 206 may each comprise a grid configured to facilitate image analysis. It will be understood that the white background facilitates analysis of grains pigmentation and or other color defects, whereas the black background facilitate analysis of geometric (shape) defects of grains. In some exemplary embodiments, the second background surface 206 (black) can be recessed with respect to the first background surface 205 (white). The black background is recessed with respect to the white background in order to avoid reflection of the black background onto transparent grains while they are still in front of the white background. In other words, if the black background was flush with the white background the black background could cause artifacts on the grains that face the white background. It should be noted that, an image of the white background is analyzed for color and hue contamination, thus black reflection (artifact) may be confused for contamination.

It should be noted that parameters of the background or backgrounds can be manually or automatically changed such as width of each background, positioning of the background one on respect to the other, colors of the backgrounds, etc.

Figure 4:
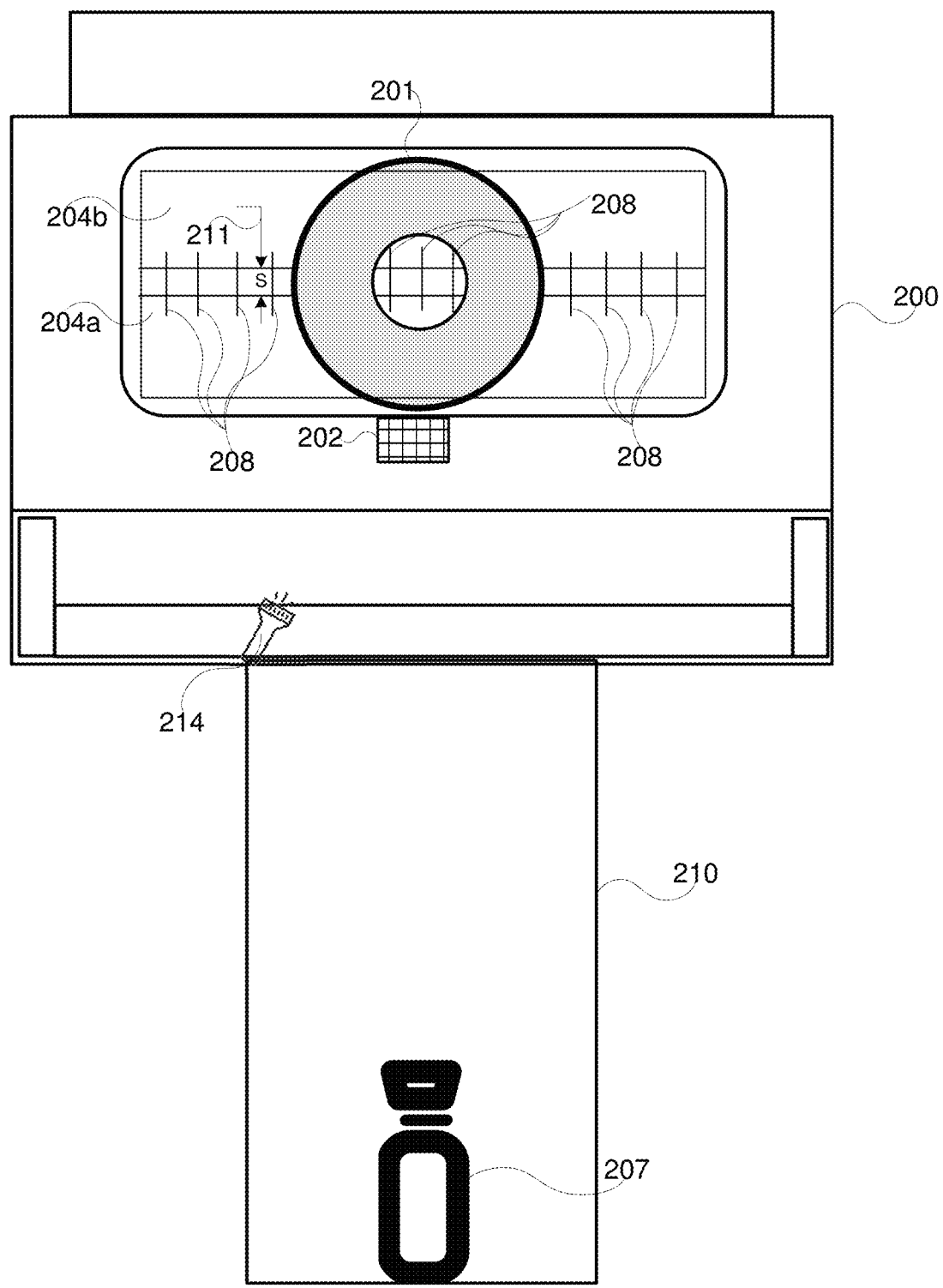
FIG. 4 shows a top view of the automated grains inspection apparatus, in accordance with some exemplary embodiments of the disclosed subject matter.

Referring now to FIG. 4 showing a top view of the automated grains inspection apparatus (AIA) 100, in accordance with some exemplary embodiments of the disclosed subject matter. Slot feeder 204 further comprises a plurality of blades 208, which are also shown in FIGS. 2 and 3. In some exemplary embodiments, the plurality of blades 208 that are organized perpendicularly along the slot feeder 204 can assist in dispensing the grains uniformly across the FOV, i.e., curtainlike formation. The blades 208 also facilitate in regulating the flow of grains through the feeder since the buildup of the grain pile can be controlled.

The blades can be moved one in respect to the others, manually or automatically.

Figure 5:
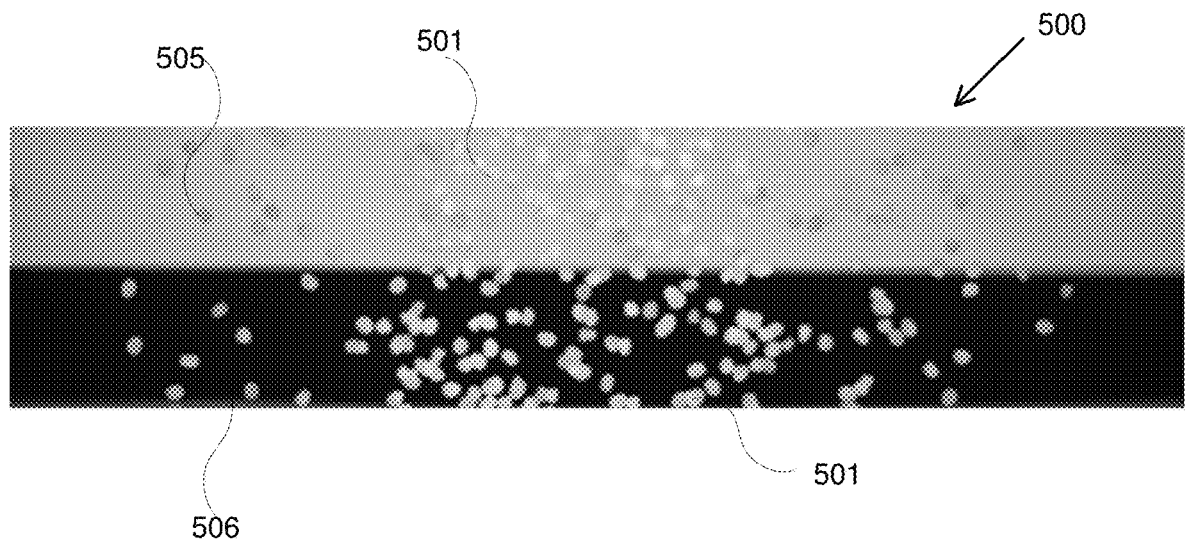
FIG. 5 is a screenshot of a video frame showing grains in inspection process, in accordance with some exemplary embodiments of the disclosed subject matter.

Referring now to FIG. 5 is a screenshot of a video frame showing grains in inspection process, in accordance with some exemplary embodiments of the disclosed subject matter. The video frame 500 shows an image of captured grains 501 in the ROI in front of the white section 505 and black section 506. It should be noted that, the white section 505 enables analyzing grains 501 pigmentation, color and hue qualifications with respect to predetermined thresholds. On the other hand, the black section 506 enables analyzing grains 501 for geometric size, shape, and structural properties qualifications with respect to predetermined thresholds. In cases the grains are dark, the information retrieved from each of the backgrounds is the opposite from the information retrieves for light color grains that are shown in FIG. 5.

Figure 6:
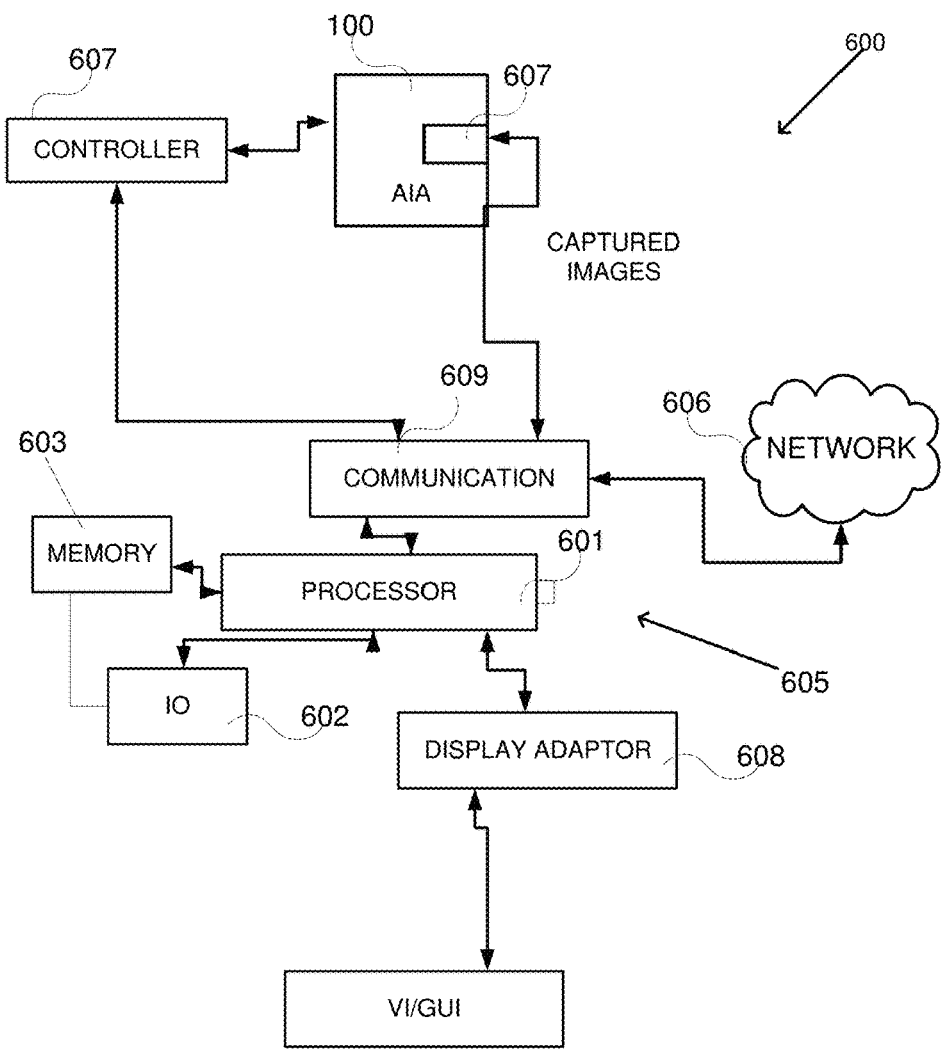
FIG. 6 shows a block diagram of a grains inspection system, in accordance with some exemplary embodiments of the disclosed subject matter.
Figure 7:
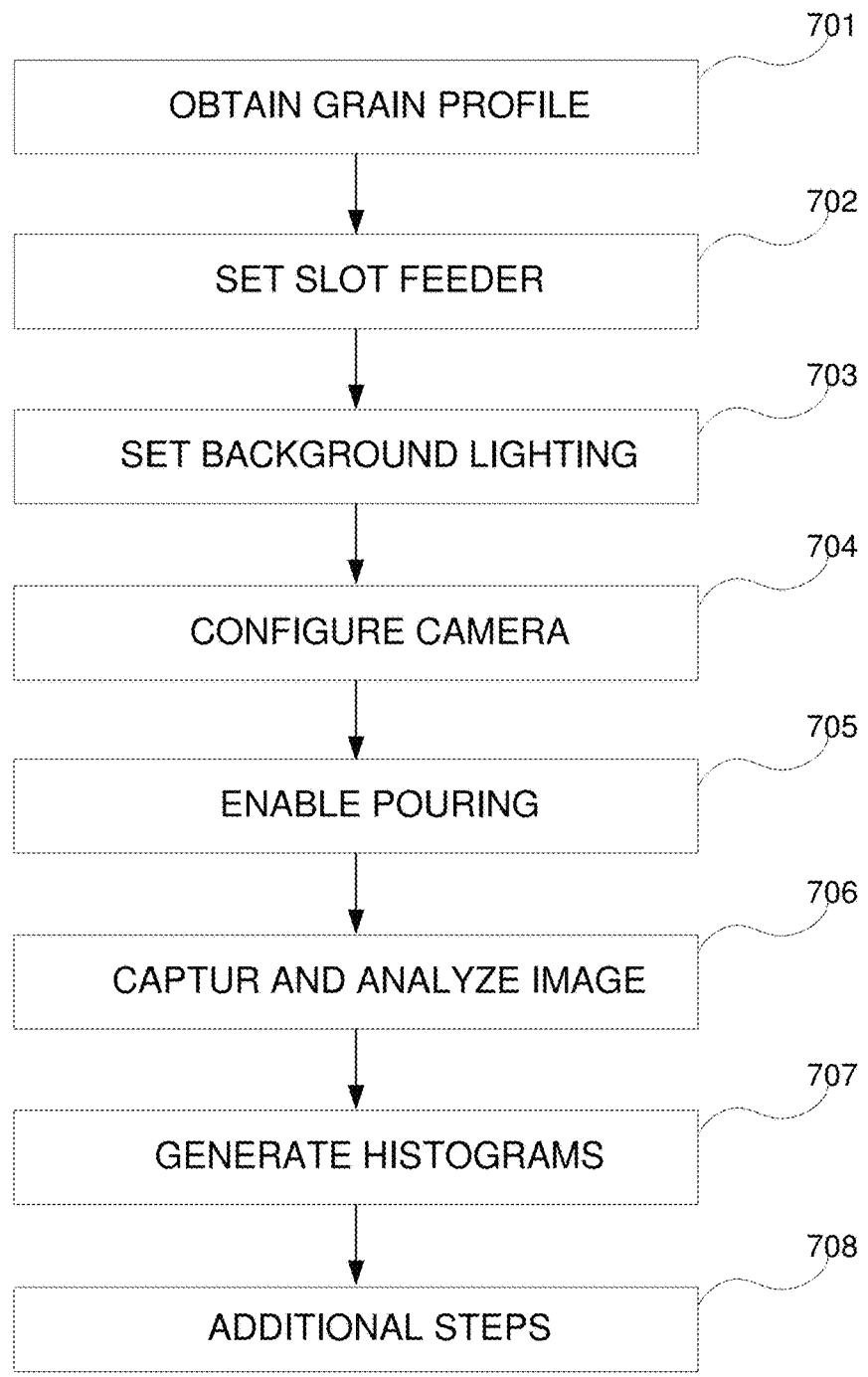
FIG. 7 shows a flowchart diagram of a method for grains inspection, in accordance with some exemplary embodiments of the disclosed subject matter.

Referring now to FIG. 6 showing a block diagram of a grains inspection system 600, in accordance with some exemplary embodiments of the disclosed subject matter. System 600 is a computerized apparatus adapted to perform methods such as depicted in FIG. 7.

In some exemplary embodiments, system 600 comprises an AIA 100 that is communicating with a processor 601. Processor 601 is a preferably a central processing unit (CPU), a microprocessor, an electronic circuit, an integrated circuit (IC) or the like. Additionally, or alternatively, system 600 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 601 can be utilized to perform computations required by system 600 or any of its subcomponents.

In some exemplary embodiments of the disclosed subject matter, system 600 can comprise an Input/Output (I/O) Module 602. System 600 can utilize I/O Module 602 as an interface to transmit and/or receive information and instructions between system 600 and external I/O devices using devices such as mouse, keyboard, or touch screen. In some exemplary embodiments, the processor 601 is comprised within a workstation 605 that comprises also a memory 603, a display adaptor 608, a communication module 609, or the like. The communication module 609 can be interfacing with a network 606.

In some exemplary embodiments, I/O module 602 may be used to provide an interface to a user of the system, such as by providing output, visualized results (such as depicted in FIGS. 5, 8, 9, and 10), reports, such as grain size, improper cutting monitoring and color/hue defects, or the like on the display 608 using UI or GUI. The user can use workstation 605 to input the information, such as pass/fail thresholds, discarding grains batch, conducting statistic calculations based on previously inspections that are retained in the system or in a network repository. However, it will be appreciated that system 600 can operate without human operation.

In some exemplary embodiments, network 606 can be used to facilitate communication between processor 601 with cloud computing server (not shown) such as amazon web services (AWS) having increased and scalability. Additionally, or alternatively, network 606 connection can be used to communicate with another apparatus or a data repository of the production facility. Additionally, or alternatively, system 600 may use network 606 connection for retaining recoded information of the AIA 100 in cloud repository (not shown) or any other network storage.

In some exemplary embodiments, system 600 comprises a controller 604. The controller 604, interfaced with processor 601 via communication 609 is configured to drive and sense activities associated with electro-mechanic and or pneumatic components of the AIA 100 and the camera 607 within the AIA, such as illumination, image capturing, IOs, and the span of the slot. The controller 604 communicates with the processor 601 and can automatically control the AIA 100. In some exemplary embodiments, the drive and sense activities can comprise manipulating the inlet funnel 201; feeder mechanism 202; the slot feeder 204; the video camera 207; the sorting mechanism 213; the background illuminations 214; the sliding mechanism 215; and any combination thereof, or the like.

In some exemplary embodiments, the camera 607 in the AIA 100 is interfacing with processor 601 to transfer the captured images and convey the images in digital representation to the processor 601 for image analysis. In some exemplary embodiments, the images captured from the at least one camera can comprise cameras selected from a group consisting of video cameras, stills cameras, area camera, line scan camera, video cameras, a monochromatic camera, a color camera, and any combination thereof, or the like.

In some exemplary embodiments, camera 607 can comprise an array of optical filters (not shown) adapted to be engaged in front of a lens of the at least one camera by the controller 604.

In some exemplary embodiments, system 600 comprises a memory unit 603. Memory unit 603 can be persistent or volatile. For example, memory unit 603 can be a flash disk, a random access memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as flash device, memory stick, or the like. In some exemplary embodiments, memory unit 603 can retain program code to activate processor 601 to perform acts associated with any of the steps shown in FIG. 7. Memory unit 603 can also be used to retain images captured by camera 607, a plurality of grain profiles, outcomes of system 600 (reports), image analysis of each inspection sequence, reference profiles comprising thresholds for different types of grains, statistical analysis associated with reference profiles; and any combination thereof, or the like.

The components detailed in system 600 can be implemented as one or more sets of interrelated computer instructions, executed, for example, by processor 601 or by another processor. The components can be arranged as one or more executable files, dynamic libraries, static libraries, methods, functions, services, or the like, programmed in any programming language and under any computing environment.

Referring now to FIG. 7 showing a flowchart diagram of a method for grains inspection, in accordance with some exemplary embodiments of the disclosed subject matter.

The inspection system 600 actions are based on the data generated by the image processing it preforms by itself regarding the appearance of the pellets. Optionally, additional data is collected by the system 600 from sensors connected directly to the system 600 and/or by data imported from other line control devices on the production line. For example, the system 600 can receive speed, temperature, and/or pressure readings from the production line and use the information from those sensors alone with the information from camera 207 or other cameras in order to deduce the action needed.

The data gathered by the system 600 is processed by means of statistical process control tools (SPC), artificial intelligent (AI) algorithms, data trends analysis, and specially written algorithms, in order to predict upcoming failure or point on an existing production failure.

In step 701, a grain profile is obtained. In some exemplary embodiments, a grain profile associated with type of grain to be inspected can be obtained from a data repository of system 600, such as for example, memory 603 or a storage connected to network 606. The grain profile can be one of a plurality of grain profiles retained in the repository, wherein each grain profile is associated to different type of grain. In some exemplary embodiments, the types of grains can differ from one another in terms of size, color, shape, transparency, weight, and any combination thereof, or the like. Therefore, each type of known grain may have a profile characterizing it for the AIA 100 of the present disclosure.

In some exemplary embodiments, each grain profile of the plurality of grain profile can comprise predetermined parameters associated to the AIA 100 setup. The parameters can comprise: camera configuration, illumination and background setup, span of the slot feeder, and standard thresholds.

In step 702, the slot feeder is set. In some exemplary embodiments, system 600 adjusts the span 211 of the slot feeder 204 to meet the requirements of a grain size as per the parameters of the current grain profile.

In step 703, the background lighting is set. In some exemplary embodiments, system 600 can set at least one of the background illuminations 214 to meet the requirements of the grains color, hue, size and transparency as per the parameters of the current grain profile. It should be reminded that illuminations 214 can be set for illuminating either sides of the backgrounds as well as both sides simultaneously. Additionally, or alternatively, system 600 can cause the illuminations 214 to alternate side illumination during the inspection process as well as dimming the illumination during the process, all in order to improve image resolution of the grains inspection.

In step 704, the camera is configured. In some exemplary embodiments, system 600 can set at least one camera 207 to meet the requirements for detecting impurities, change in geometry, and color of the grains as per the parameters of the current grain profile. Detection requirements can be for example impurities, dark specks or dark gels, dark and bright contaminations, foreign material, discoloration, cross-contamination, color measurement and color shift, size deviation, shape irregularities, agglomeration, transparency, gloss. It should be reminded that, more than one camera can be used simultaneously as previously described. Additionally, or alternatively, system 600 can cause one or more cameras 207 to alternate image capturing during the sorting process as well as engaging optical filters in the image capturing process, all in accordance to the current grain profile.

In step 705, grains pouring is enabled. In some exemplary embodiments, grains can be enabled to enter the inlet funnel to initiate the grain monitoring and inspecting process.

In step 706, an image is captured and analyzed, as well as data that is collected from other sources such as other sensors and/or other line production systems. In some exemplary embodiments, a digital representation of the image can be routed by the video front end 207 to processor 601 for image analysis. The image analysis is configured to determine criteria of each grain in the image, wherein the criteria are selected from a group consisting of requirements for detecting impurities, change in geometry, color of the grains, for example impurities, dark specks or dark gels, dark and bright contaminations, foreign material, discoloration, cross-contamination, color measurement and color shift, size deviation, shape irregularities, agglomeration, transparency, gloss. In some exemplary embodiments, the images are retained in the repository in records of 60 seconds each.

In step 707, histograms are generated from all or part of the data that is collected in step 706. In some exemplary embodiments, system 600 is adapted to generate a histograms representation, such as depicted in FIGS. 8 to 16, for different criterions as listed above, for example. It should be noted that the horizontal axis of each histogram represents dimension, preferably but not necessarily given in microns and the vertical represents incidences, scaled in 100K grains. Each bar of each histogram comprises a representing thumbnail-image per 100K grains. Optionally, additional data, for example data that is collected by means of statistical process control tools (SPC), artificial intelligent (AI) algorithms, data trends analysis, and specially written algorithms, can be used. All the data processed by system 600, including the SPC and AI can be based also on information from other sensors from other production lines or other sensors from the system.

The visual information, for example the histograms, as will be depicted herein after can be connected and displayed for any one of the sorting systems described herein before as well as in other sorting and inspecting systems.

The inspecting systems can be used for additional actions—step 708—such as:

1. Ejecting of the disqualified pellet using air nozzles or mechanical flaps, this action allows removing the disqualified pellets alone with zero to relatively small number of pellets that were disposed close to it.
2. Diverting of the inspected material stream using a diverter valve, or other mechanism that shifts the entire material flow. This action removes the disqualified pellets with a relatively large number of pellets that are in the material stream with disqualified pellets at the same time.
3. Send a command to the production line control to stop the production, or to set a new set point to one of the production parameters such as speed, temperature, pressure, and/or other parameters in order to prevent the manufacturing of disqualified pellets or to improve their quality.
4. Generate alarms to the productions line operator to give indication on production failure or to indicate that the production is shifting good and stable production to less good or unstable production that may cause production failure if this will not be corrected by the operator.
5. Generate recommendation to the line operator on actions to be taken in order to maintain or achieve good and stable production.

In some exemplary embodiments, the sorting or other actions are executed based on predetermined parameters of a given grain profile that comprise standard thresholds. The thresholds dictate predetermine pass/fail discrimination levels for each criterion. System 600 can also generate quality reports.

Figure 8:
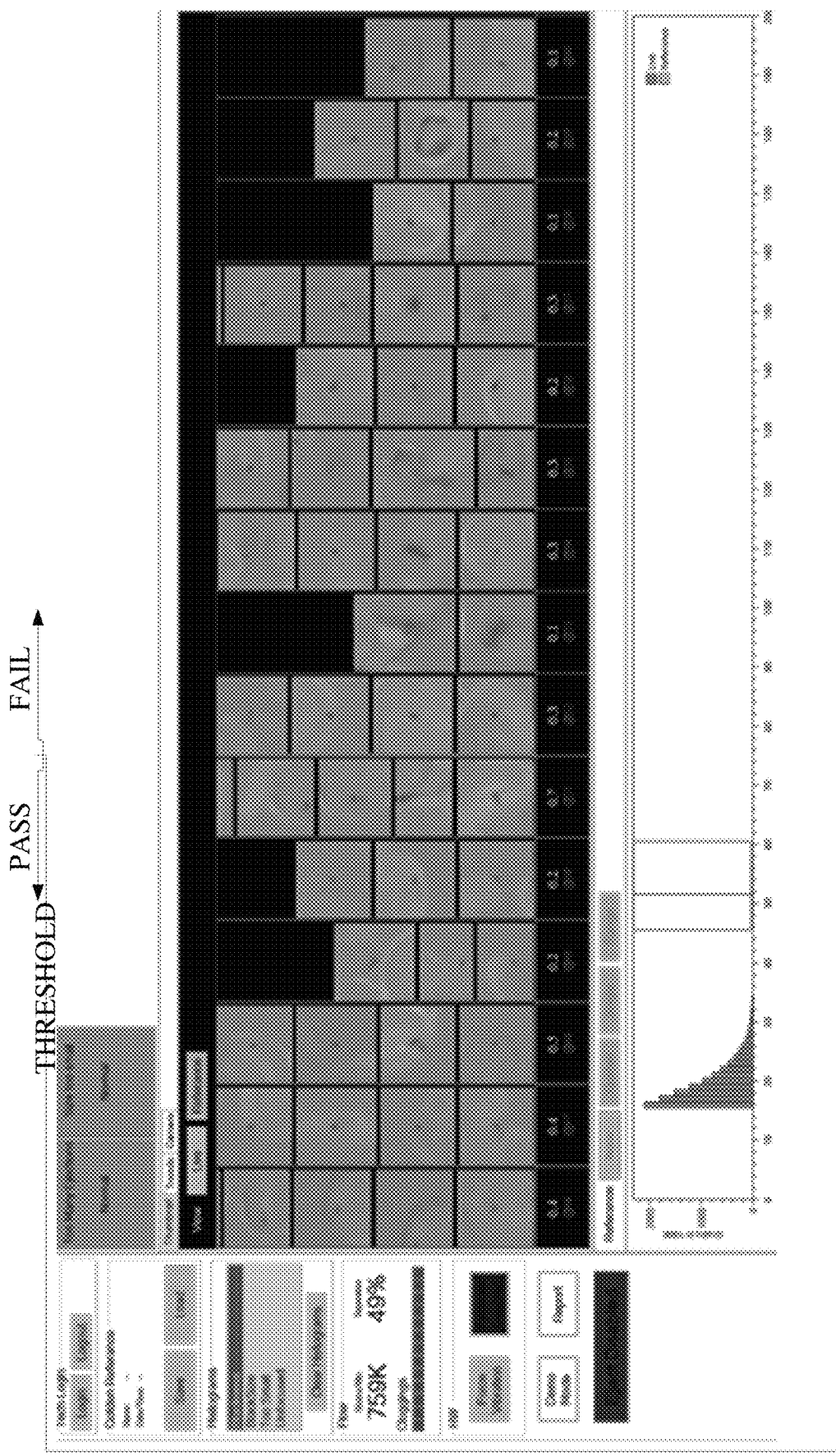
FIG. 8 shows a workstation screenshot depicting an outcome report, in accordance with some exemplary embodiments of the disclosed subject matter.
Figure 9:
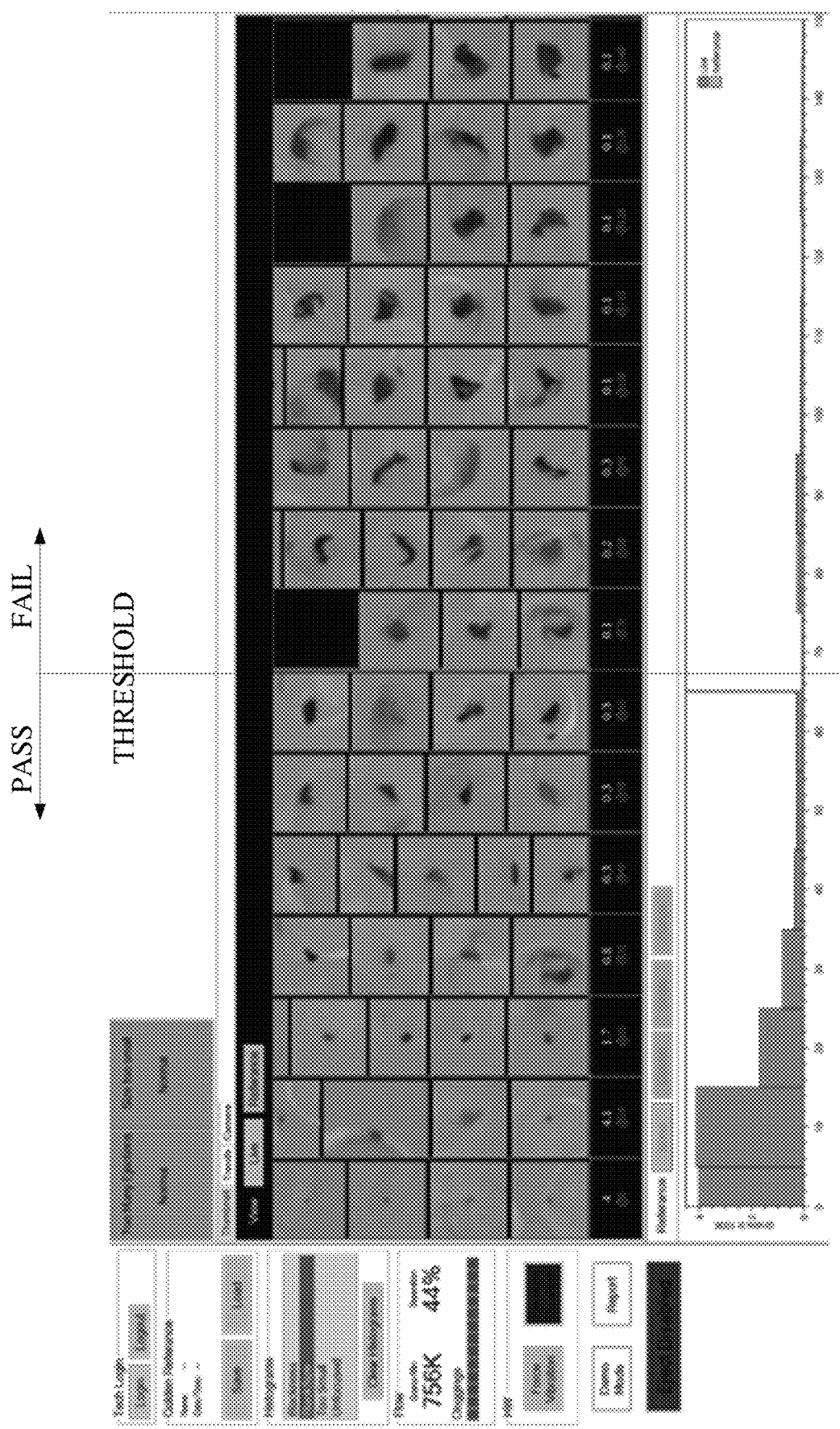
FIG. 9 shows the workstation screenshot depicting another outcome report, in accordance with some exemplary embodiments of the disclosed subject matter.
Figure 10:
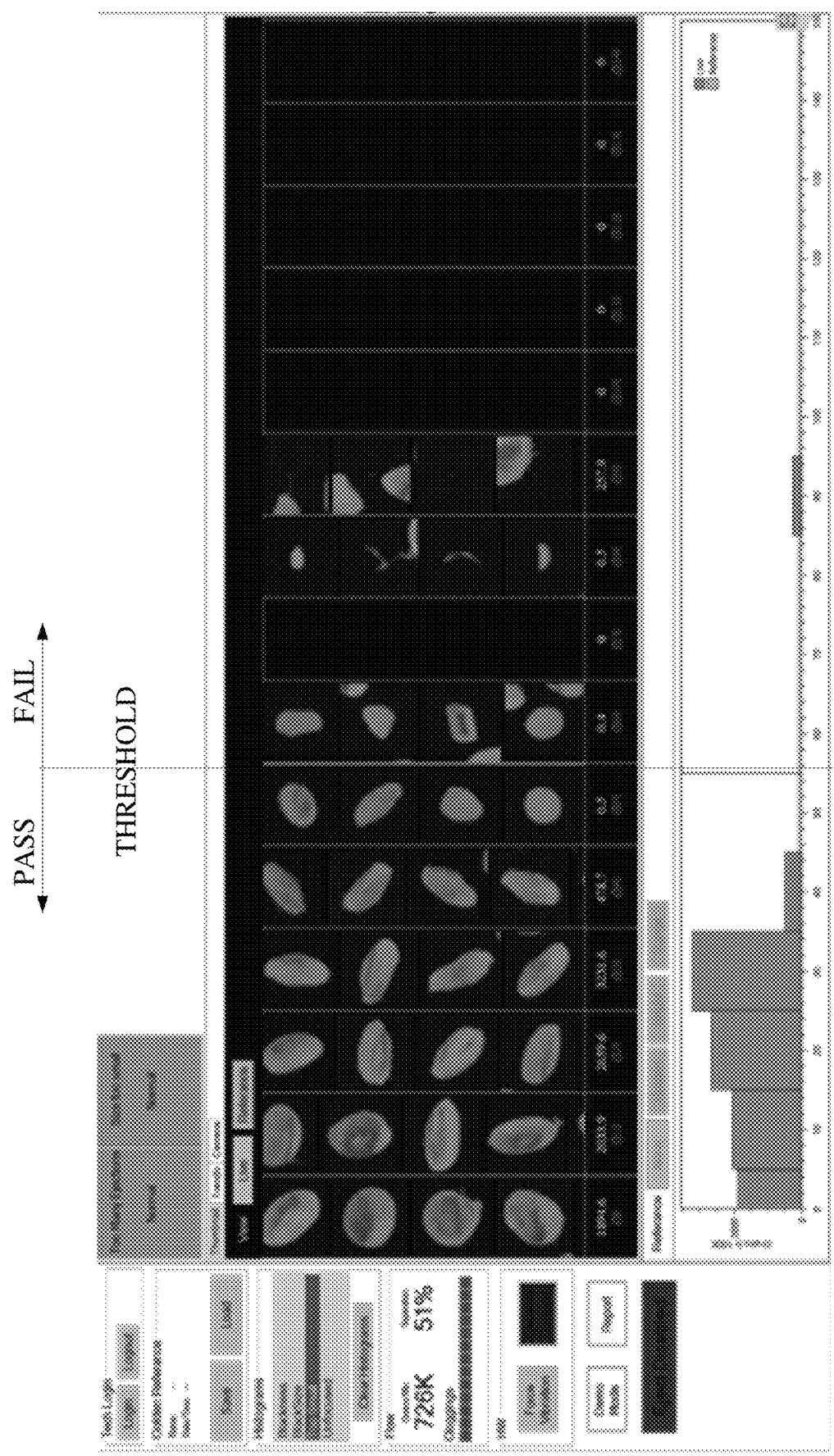
FIG. 10 shows the workstation screenshot depicting yet another outcome report, in accordance with some exemplary embodiments of the disclosed subject matter.

Reference is now made to FIGS. 8, 9, and 10. FIG. 8 shows a histogram of blackness criteria measured in grey levels; FIG. 9 shows a histogram of black size criteria measured in microns; and FIG. 10 shows a histogram of grain size criteria measured in microns. In some exemplary embodiments of the disclosed subject matter, system 600 can react to any deviation from the standard in one or more than one actions described in step 708. It should be noted that other parameters can be monitored, inspected, and represented in the histograms such as grain size, grain shape, contamination size and shape, color deviation, absolute color of the grains or items, etc.

Figure 11:
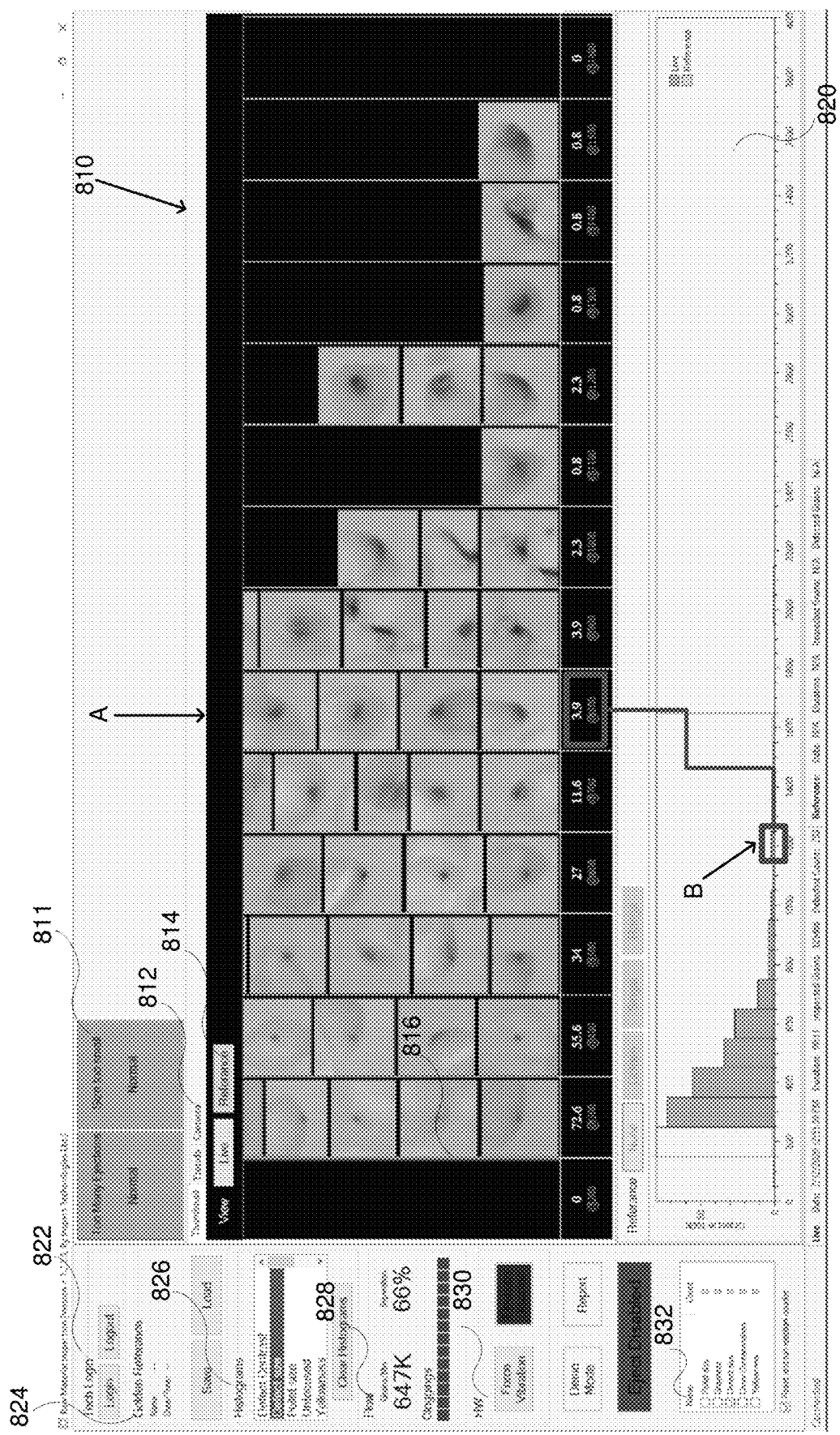
FIG. 11 shows a workstation screenshot depicting an outcome report, in accordance with some exemplary embodiments of the disclosed subject matter.

Referring now to FIG. 11 showing a workstation screenshot depicting an outcome report, in accordance with some exemplary embodiments of the disclosed subject matter. Accuracy and reliability of inspecting systems depend very much on the competence and working quality of the system operators, the correct management of the setting up and controlling the inspecting system. In reality, this sets out several very serious challenges to users, even to the experts. Once a user is operating the inspecting system, at least two types of information representations are important in order to give the system the correct instructions and to effectively conduct the inspecting process: statistical information and images information. In accordance with embodiments of the disclosed subject matter, the user is capable of interfacing and providing the instructions to the inspecting apparatus based on a statistical analysis combined with the captured images so that both types of information are simultaneously presented to the user. This feature will be further elaborated hereinafter. The upper part of screen 220 displays a control indicator 811 showing the status of the results of the current inspection task. According to an embodiment of the current subject matter, control indicator 811 comprises indications on number of ejections and on size. In the event that the status is normal, the control indicator 811 is green. In the event that the status is not normal, the control indicator 811 will be marked as yellow or as red. Any other colors are possible to be used without limiting the scope of the present subject matter. Optionally, more than one control indicator 811 can be shown on screen 220, showing indication of several factors according to the operator's request, for example, showing inspection tasks that failed or predictions for failure. The central part 810 of screen 220 displays visual information about the inspected objects. According to this embodiment, this screenshot shows a display of the inspected objects during a process of pellets with dark contamination inspection. In mode tab 812, several display modes are presented, and the user can change from one mode to the other. In this embodiment, the display mode is in a form of thumbnail pictures. In thumbnail mode live or reference views of a specific task at a specific time is presented. Another display mode is trend, showing a graphic view of the monitored parameters for a chosen time interval as will be further described in FIG. 12. Another display mode is camera view. State tab 814 has at least two states-live view and reference view, as will be further described in FIG. 13. The central part 810 of screen 220 shows thumbnail of the pellets which are relevant for the task. Line 816 is operated to set discrimination level. Each square 818 is a representation of an object that is inspected in AIA 100. Screen 220 can display a plurality of squares 818 representing the inspected population. The latest images are displayed on central part 810 appear on the bottom of screen 220, pushing the images of prior squares 818 up, in a first-in-first-out stack manner. The number of squares 818 that are displayed, are associated with the number of specific grains and the height of the central part 810. On the right-hand side of the central part 810, only one type of the specific grain is detected and therefore, only this specific one is displayed in a thumbnail, however, on the left-hand side of the central part, more than 4 thumbnails are present but only four of them are shown. If the height of the central part would have been higher, more thumbnail pictures would have been presented. The lower part 820 of screen 220 displays a quantified date in a histogram view. Optionally, squares 818 can display images according to a criteria determined by the operator, for example best image quality items or most suitable representing image.

General task boxes comprise tech login box 822, golden reference box 824, histogram box 826, flow box 828, HW box 830 and fleeting box 832. Tech login box 822 comprises login button 8221 and logout button 8222 to be pressed by the user entering and exiting the system. Golden reference box 824 is used to set a snapshot of a golden reference during an inspection, either the current inspection task or generally for more than one inspection tasks. Once save button 8241 is pressed by the user, the current thresholds as well as all other decisions and parameter settings that apply will be saved as a golden reference. Once the load button 8242 is pressed by the user, a graphic interface of the golden reference is shown on screen 220. Histogram box 826 shows the current task. The user can scroll down the list of options of tasks that appear in the histogram box, for example defect contrast, defect size, pellet size, unfocussed, yellowness and the like. When clear histograms button 8261 is pressed by the user, the histograms shown in central part 810 of screen 220 are cleared and the central part 810 of screen 220 is empty. Flow box 828 shows on the left-hand side the count of pellets per minute 8281. Flow box 828 shows on the right-hand side the percentage of separation of the pellets 8282 is shown. Cloggings bar 8283 shows a visual indication of the flow of the inspected grains in funnel 201. If the flow is good, cloggings bar 8283 will be green. If there are obstacles or if the flow is not good, cloggings bar 8283 will red. HW box 830 ejection disabled button 8302 can be either red or green, and the color changes upon pressing the ejection disabled button 8302. Once report button 8304 is pressed, a report of the current task is being generated and sent to the user. At the bottom of HW box 830, an indication part 8305 shows whether ejection is disabled. Fleeting box 832 is used when an ejection enablement is done using ejection disabled button 8302. In fleeting box 832 the user can indicate by checking the box in the name button 8321. Preferably, the name is the description of the task, and a counter of the number of ejections that occurred is shown. The user can reset the count of the fleets by checking the counter button 8322.

According to one embodiment of the disclosed subject matter, both types of information discussed herein before, are displayed on screen 220, allowing the user a broad view of the results of the inspection process. On central part 810, thumbnails view of the images of the inspected items appears. On corresponding lower part 820, histogram view of the statistical information about the inspected items appears. Specific square 818, which is part of column A###, is a thumbnail image of an inspected item that is part of a group that appears in that column. For example, column A ### is a segment of inspected items in a task named defect size as appears in histogram box 826. As described before, if the height of the central part 810 would have been higher, more thumbnail pictures could have been presented—all from the same group. Statistical information related to the items that are displayed in column A###, for example the intensity distribution of the parameter, is shown in the corresponding histogram bar B###. In some embodiments of the current subject matter, at the button of each column A###, a synopsis of the statistical information is displayed. Having the ability to simultaneously explore the corresponding two types of information, statistical and visual, gives the user better understanding of the inspecting task and of the specific items being inspected. Based on the image information, the user can decide whether the irregularity is severe and decide if an instruction to the system needs to be given. Based on the statistical information, the user can make decisions related both to the specific corresponding image or images as well as to the entire inspecting task. For example, the highest peak of the histogram represents the location of the value that occurs most often in a data set, also called the mode of the data set. This statistical information is changing during the inspection process, and can affect instructions and decisions made by the user. Having a simultaneous view of the image information in column A## in reference with the peak or mode in the correspondence histogram gives the user a wide and relevant knowledge base for analysis and instruction generating. For example, threshold setting can be done more efficiently since the operator can examine the images in light of the statistical information. In some cases, for example, the operator can realize that a defect size threshold that was set is too rigorous, and the size of the defect can be larger before an item is categorized as defected.

Figure 12:
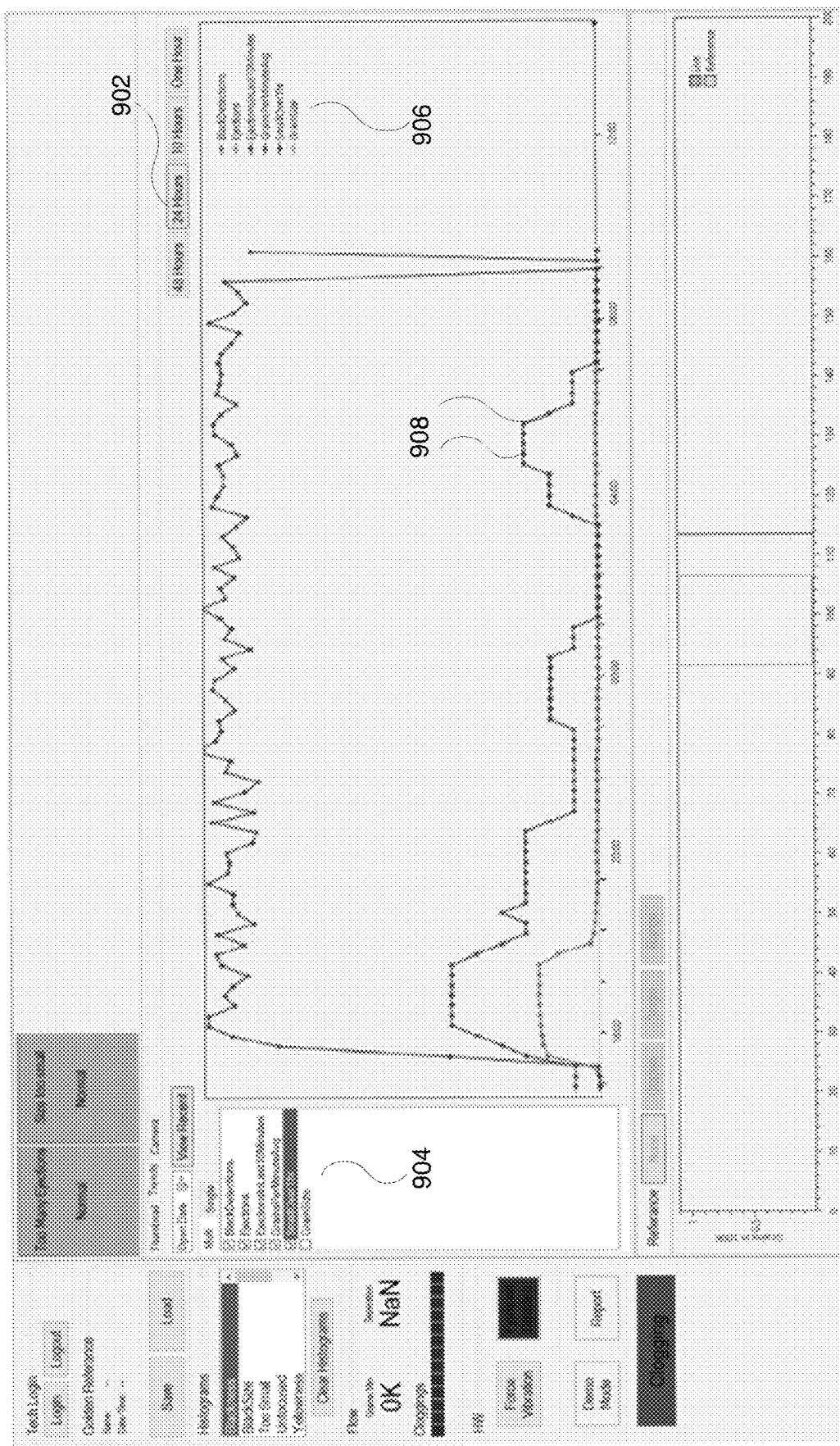
FIG. 12 shows a workstation screenshot depicting an outcome report in trend view, in accordance with some exemplary embodiments of the disclosed subject matter.

Referring now to FIG. 12 showing a workstation screenshot depicting an outcome report in trend view, in accordance with some exemplary embodiments of the disclosed subject matter. In trend view, the information is displayed as a graph of the monitored parameters for a chosen time interval, for example several hours or days. Duration box 902 comprises at least one button showing the time interval for viewing. By pressing one of the buttons in duration box 902, the relevant information is displayed. For example, when pressing the 24 hours button, as shown in FIG. 12, the information from the last 24 hours is displayed. Parameters checkbox 904 lists the parameters that can be monitored, for example black detections, ejections, ejections last 10 minutes, grain per minute average, small over threshold, grain size and the like. In central part 810 of screen 220 a graphic view of the parameters' information and the change during the time. On the right-hand side of central part 810 of screen 220, the graphic legend 906 appears, showing the specific graphic representation of each parameter. For example, black detections are marked in green, ejections are marked in light brown, ejections last 10 minutes are marked in dark red, grain per minute average are marked in blue. By clicking a specific dot 908 the interface changes to be of the thumbnail view as described before. It should be noted that any combination of colors is possible. Trend view allows the user to visually evaluate historical information about prior tasks at a certain time, and to set thresholds according to such information, as will later be explained in FIGS. 14A, 14B, 15A and 15B.

Figure 13:
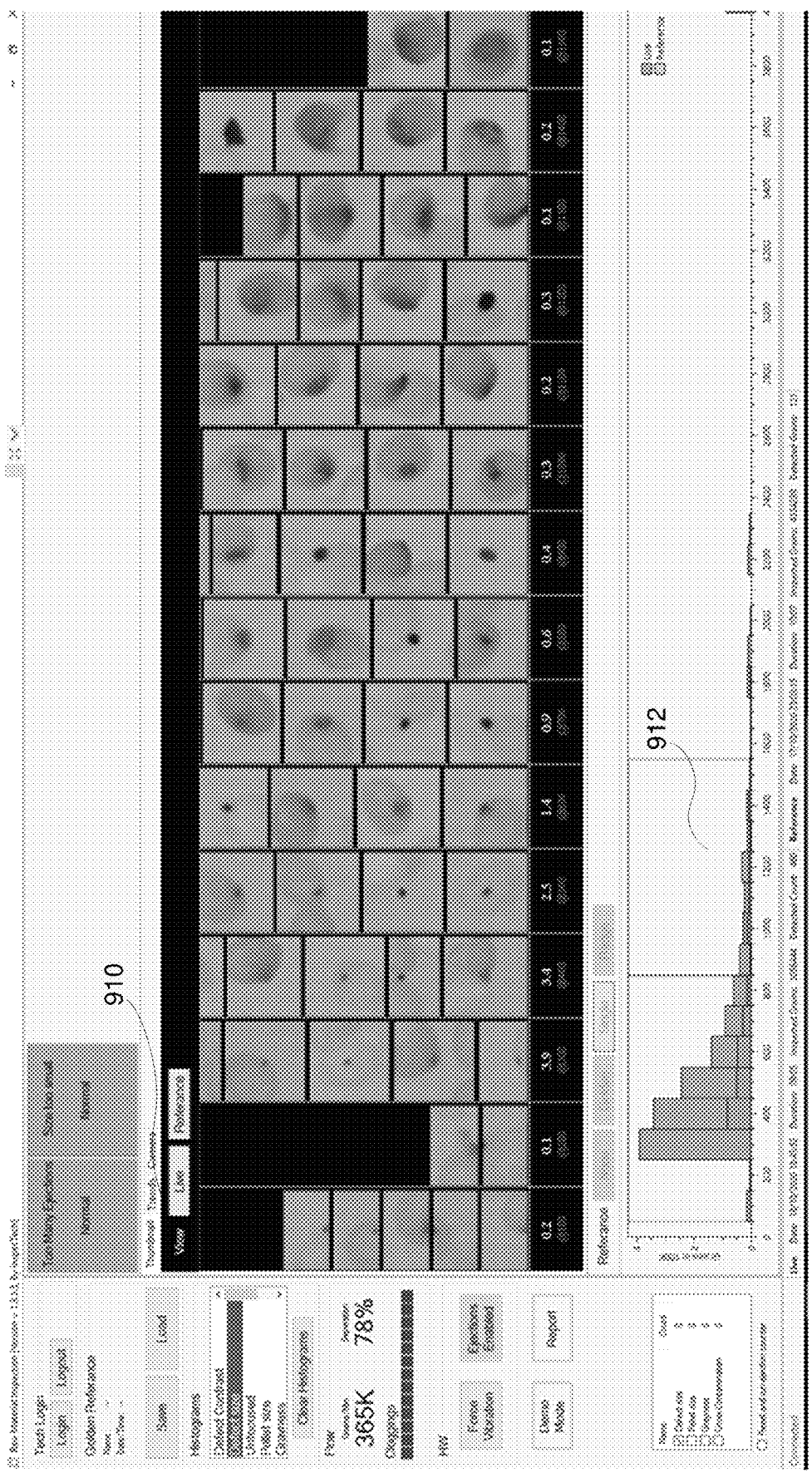
FIG. 13 shows a workstation screenshot depicting an outcome report in thumbnail view, in accordance with another embodiment of the disclosed subject matter.

Referring now to FIG. 13 showing a workstation screenshot depicting an outcome report in thumbnail view, in accordance with another embodiment of the disclosed subject matter. In thumbnail mode, view button 910 has two modes that the user needs to check—live view or reference view. If live view is pressed, the display is of view of the current inspection run. In the event that reference view is pressed, the display is of another run such as the golden reference or any other historical reference. In reference box 912, description of reference is displayed, and the user presses the option he wants to be displayed—golden, single, range or none. In the lower part 820 of screen 220, view of two histograms is displayed—blue for live view and green for reference view. Other colors can be chosen. Display of histograms of both current inspection task and general task statistical information allows the user to explore and compare the information in order to make an informed decision. General task statistical information can be, for example, information about similar tasks in a chosen time interval or a golden reference graphic information. For example, having wealth of information about current task in relation with other tasks in the specific system as well as in other apparatuses so as to compare the results in the different systems can give the operator an indication about the production line. Another example is comparing inspection of items from one production batch to another. Such information can be monitored over time to get insights on how to improve the production.

Figure 14A:
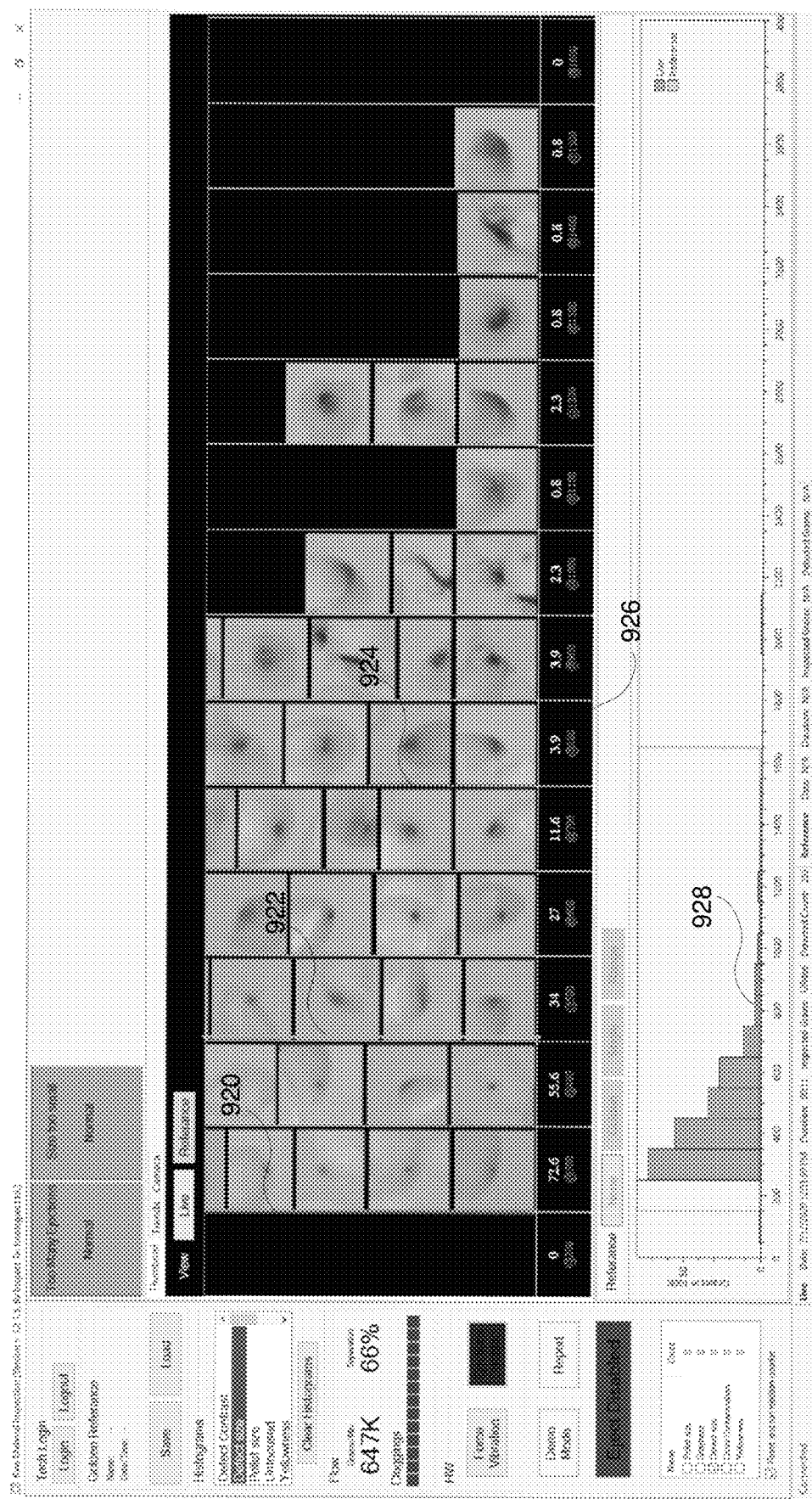
FIGS. 14A and 14B show a workstation screenshot depicting an outcome report of dark defects inspection in thumbnail view, in accordance with some exemplary embodiments of the disclosed subject matter.
Figure 14B:
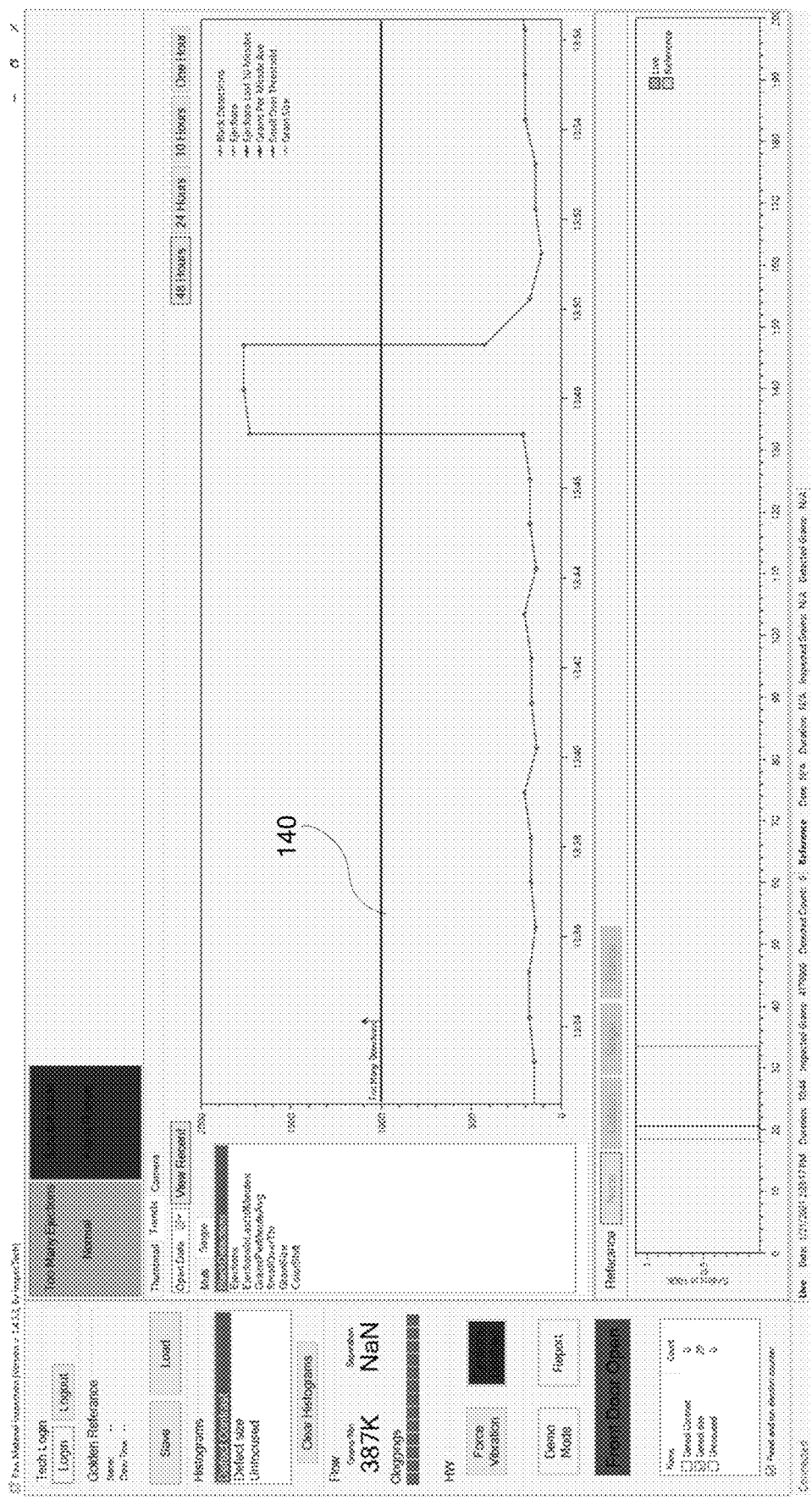

Referring now to FIG. 14A showing a workstation screenshot depicting an outcome report of dark defects inspection in thumbnail view, in accordance with some exemplary embodiments of the disclosed subject matter. Setting threshold value or discrimination level is a common activity done by a user of an inspecting system in order to define objectives related to specific inspection or analysis task. User can use threshold values to define a key performance indicator (KPI) value from which the item is good or critical. Green line 920 and green line 922 are set by the user. The green lines 920 and 922 are setting a discrimination level for the allowed number of small contaminations in the range of 200-400 micron. Optionally, an alarm is activated if the number accedes 1000, as is shown in line 140 FIG. 14B. Red line 924 is setting a discrimination level for sorting dark contaminations above 700 microns. In the lower part 820 of screen 220 the corresponding histogram view is displayed. For example, in column 926 a thumbnail display of 3.9 pellets with dark defects in the size of 800 microns (normalized to 100 k pellets) is displayed. The corresponding histograms display is shown in bar 928.

Figure 15A:
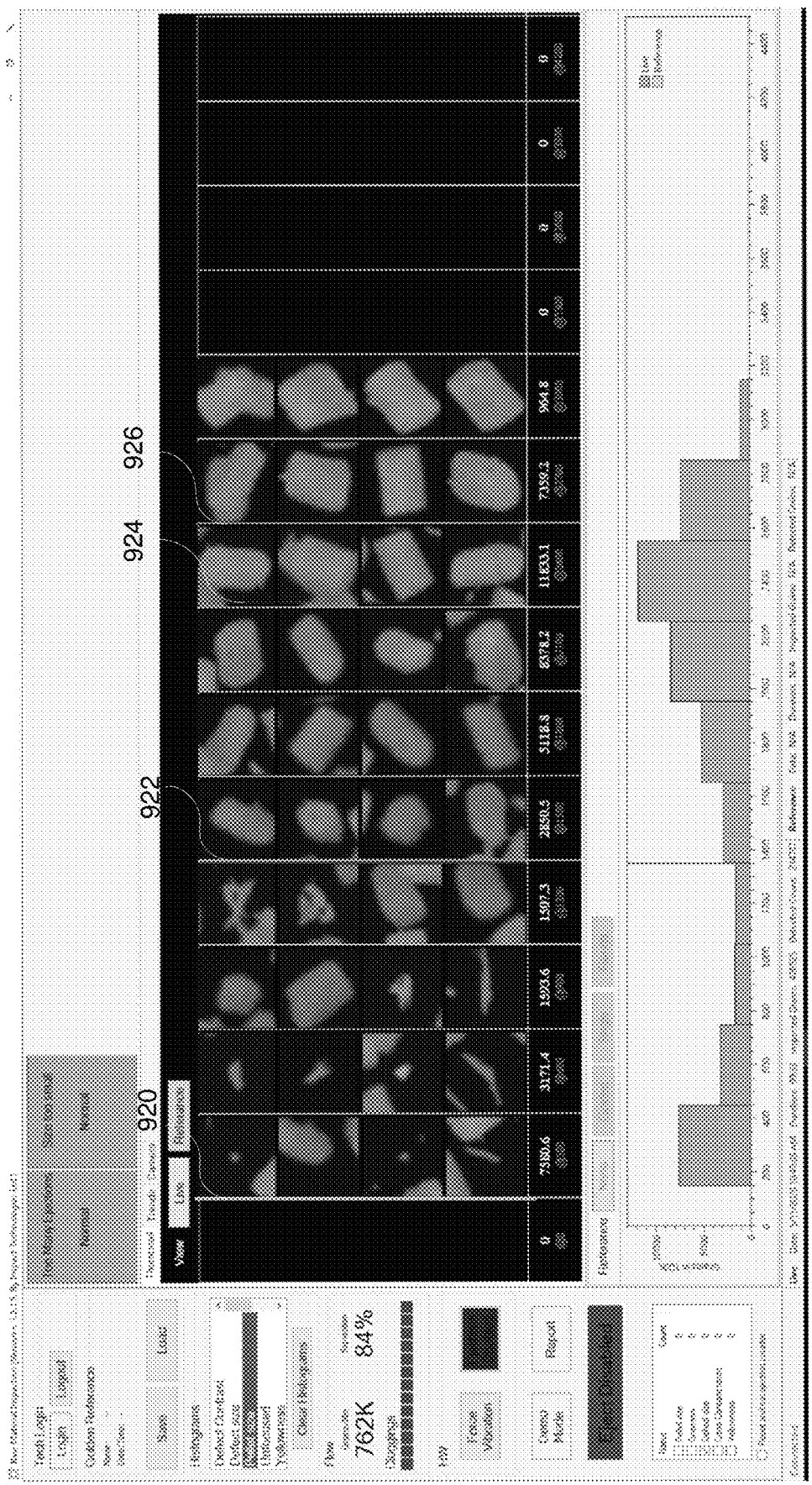
FIGS. 15A and 15B show a workstation screenshot depicting an outcome report of size monitoring inspection in thumbnail view, in accordance with some exemplary embodiments of the disclosed subject matter.
Figure 15B:
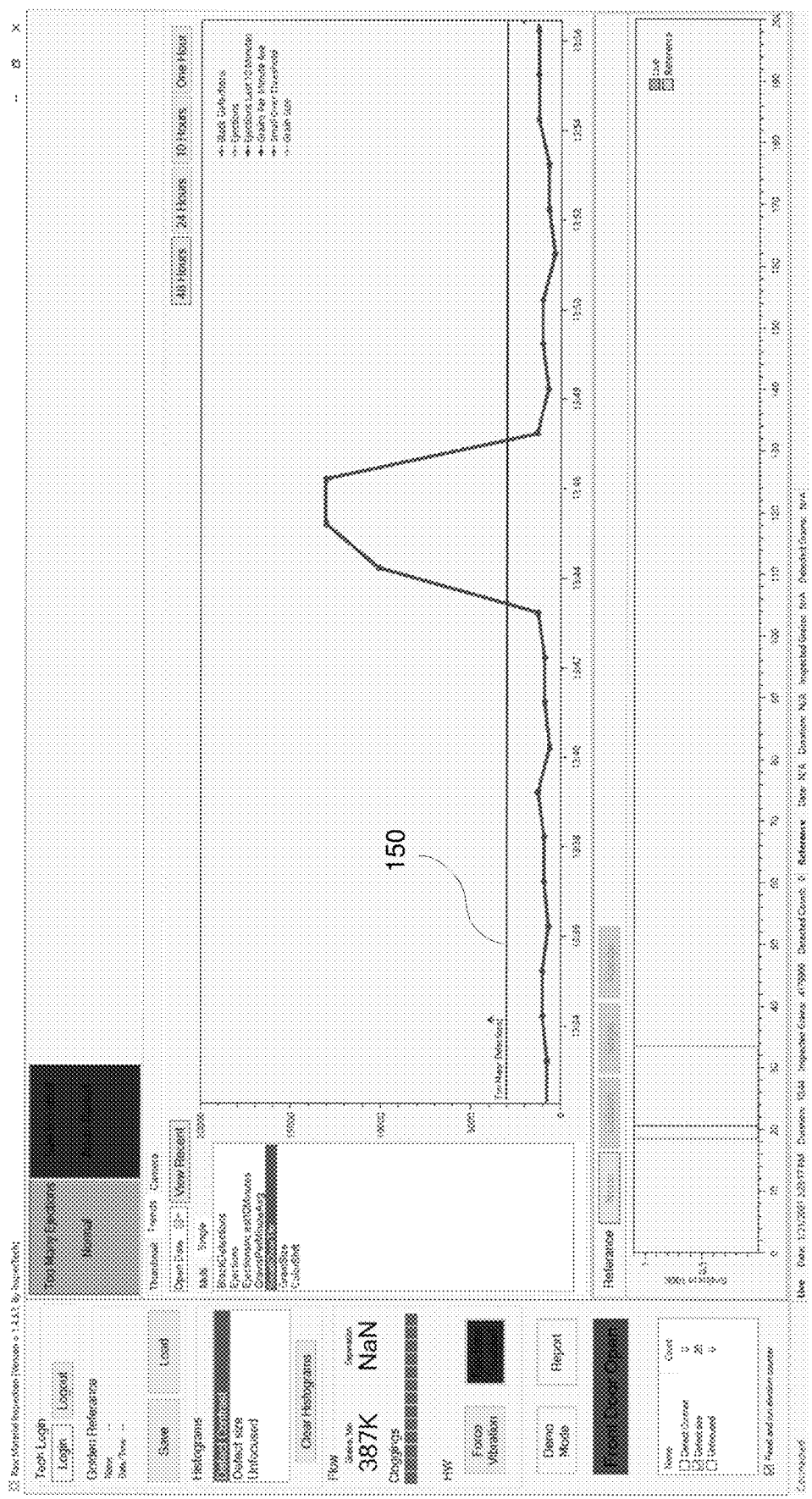

Referring now to FIG. 15A showing a workstation screenshot depicting an outcome report of size monitoring inspection in thumbnail view, in accordance with some exemplary embodiments of the disclosed subject matter. Discrimination ranges or threshold ranges result from the threshold values, e.g., target range and critical range. Depending on the threshold range in which a KPI value is, it is good or critical, for example. Green line 920 and green line 922 are set by the user. The green lines 920 and 922 are setting a discrimination level for the allowed number of small particles (normalized to 100 k pellets) in the range of 300-1200 microns. An alarm is activated if the number accedes 3 k, as is shown in line 150 of FIG. 15B. Red line 924 and red line 926 are setting a discrimination level for the allowed change in the mode of the histogram. An alarm is activated if the mode change is lower than 2.3 mm or if the mode change accedes 2.6 mm.

Figure 16:
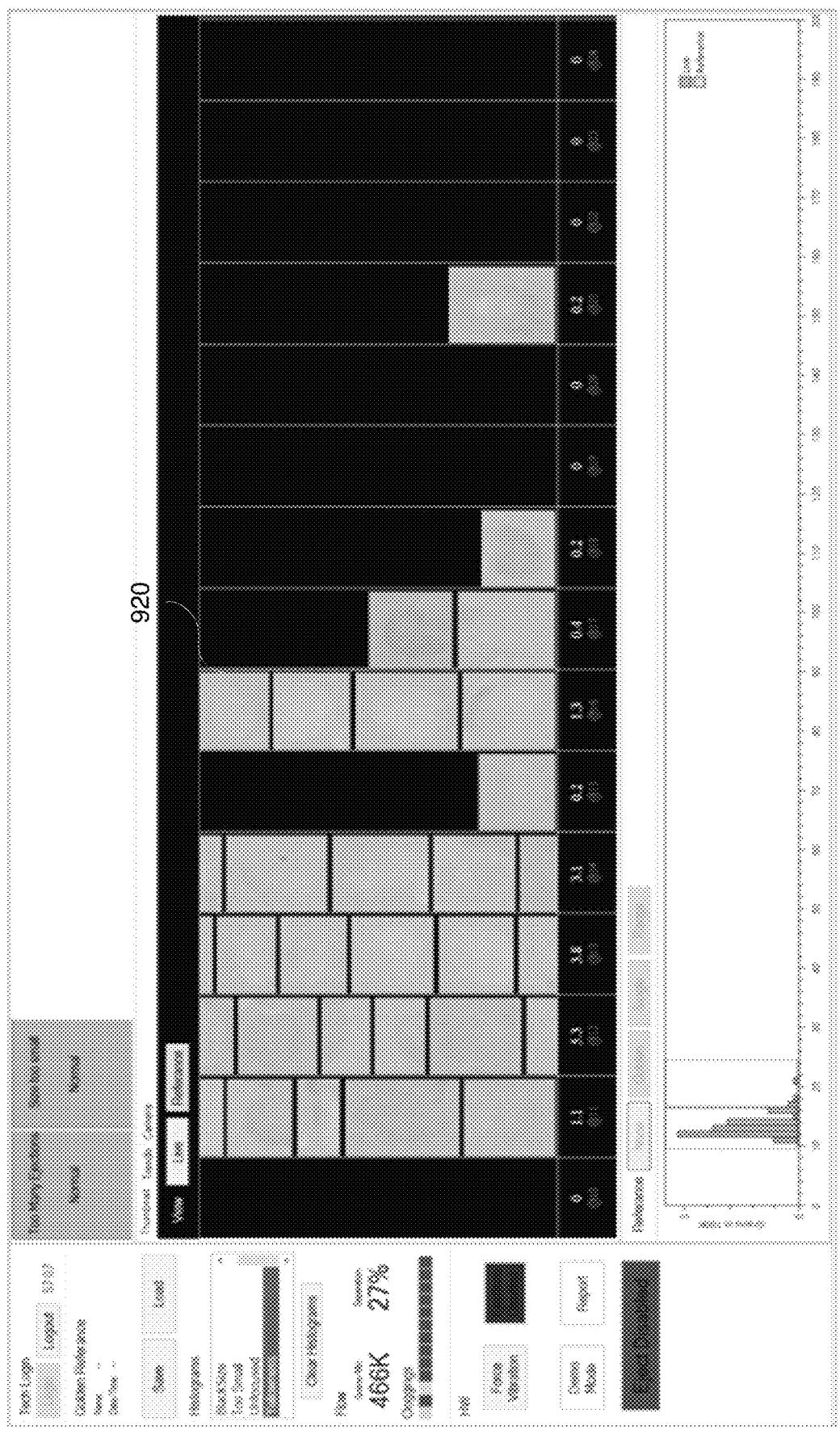
FIG. 16 shows a workstation screenshot depicting an outcome report of yellowness inspection in thumbnail view, in accordance with some exemplary embodiments of the disclosed subject matter.

Referring now to FIG. 16 showing a workstation screenshot depicting an outcome report of yellowness inspection in thumbnail view, in accordance with some exemplary embodiments of the disclosed subject matter. Green line 920 is setting a discrimination level for too yellow pellets.

Other parameters can be displayed in the same or similar manner.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A management and control system for a user to interface with an inspecting apparatus having at least one digital optical instrument, the management and control system comprising:
   a processor configured to receive images from the at least one digital optical instrument, analyze the images, and transmit instructions to the inspecting apparatus; and
   a display configured to display analysis of the images wherein the user is capable of interfacing and providing instructions to the inspecting apparatus based on the analysis of the images, wherein the display simultaneously displays histograms and at least one thumbnail-image generated in the processor based on the images, wherein the histogram represents distribution of a criteria, and the at least one thumbnail-image are images representing the criteria.

2. The management and control system as claimed in claim 1, wherein the histograms and the thumbnail-image correspond to one another.

3. The management and control system as claimed in claim 2, wherein the instructions are selected from a group of instructions consisting of sorting the items, enabling ejection of items, disabling ejection of items, generating a report, setting a discrimination level, diverting the items, setting thresholds to generate alarms, defining a data set for automatic prediction and alarming, and defining a setpoint for production line control.

4. The management and control system as claimed in claim 2, wherein the management system further comprises a memory unit communicating with said processor wherein the memory unit is configured to retain information selected from a group of information consisting of the images, reference images, a plurality of profiles of the items, system settings, system reports, image analysis, reference profiles comprising thresholds for different types of items, and statistical analysis associated with reference profiles.

5. The management and control system as claimed in claim 1, wherein the inspecting and sorting apparatus is configured to inspect items selected from a group of items consisting of beans, spices, nuts, grains, rice, vegetables, fruits, plastic grains, metal grains, glass grains, and pharmaceutical pills.

6. The management and control system as claimed in claim 1, wherein the at least one digital optical instrument is selected from a group of optical instruments consisting of X-ray detector, magnetic resonance imaging (MRI) device, computed tomography (CT) scanner, 3D data scanner, camera, and optical sensor.

7. The management and control system as claimed in claim 1, wherein the display is selected from a group of displays consisting of monitor, screen, electroluminescent (ELD) display device, liquid crystal display (LCD) device, light-emitting diode (LED) device, plasma (PDP) display, electronic hand-held device such as a tablet, and a smartphone device.

8. The management and control system as claimed in claim 1, wherein the display graphically displays graphs generated in the processor based on the images.

9. The management and control system as claimed in claim 1, wherein the inspecting apparatus is incorporated within a production line.

10. A method of managing and controlling an inspecting apparatus of items, the method comprising:
    capturing images of items inspected by at least one digital optical instrument of the inspecting apparatus;
    receiving by a processor the images from the at least one digital optical instrument;
    analyzing the images by the processor so as to have an analysis of the items;
    displaying the analysis on a display wherein histograms representing a criteria of the items are displayed simultaneously with thumbnail images of corresponding items; and
    receiving by the inspecting apparatus instructions interfaced by a user.

11. The method as claimed in claim 10, wherein the analyzing the images comprises determining the criteria of each item in the image, wherein the criteria are selected from the group consisting of impurities, change in geometry, color of the items, dark specks, dark gels, dark and bright contaminations, foreign material, discoloration, cross-contamination, color measurement and color shift, size deviation, shape irregularities, agglomeration, transparency, and gloss of the items.

12. The method as claimed in claim 10, further comprising setting thresholds based on the histogram representations, thumbnail images, and graphs.

13. The method as claimed in claim 10, wherein the instructions interfaced by a user comprises instructions selected from a group of instructions consisting of sorting the items, enabling ejection of items, disabling ejection of items, generating a report, setting a discrimination level, diverting the items, setting thresholds to generate alarms, defining a data set for automatic prediction and alarming, and defining a setpoint for production line control.

14. The method as claimed in claim 10, wherein the histograms and the thumbnail-image correspond to one another.

* * * * *